(12) United States Patent
Hattori et al.

(10) Patent No.: US 10,658,111 B2
(45) Date of Patent: May 19, 2020

(54) CAPACITOR

(71) Applicant: Murata Manufacturing Co., Ltd., Nagaokakyo-shi, Kyoto-fu (JP)

(72) Inventors: Kazuo Hattori, Nagaokakyo (JP); Noriyuki Inoue, Nagaokakyo (JP); Hiromasa Saeki, Nagaokakyo (JP); Kensuke Aoki, Nagaokakyo (JP); Ken Ito, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/864,534

(22) Filed: Jan. 8, 2018

(65) Prior Publication Data
US 2018/0151297 A1    May 31, 2018

Related U.S. Application Data

(63) Continuation of application No. PCT/JP2016/071135, filed on Jul. 19, 2016.

(30) Foreign Application Priority Data

Aug. 10, 2015  (JP) .................................. 2015-157964

(51) Int. Cl.
*H01G 4/33* (2006.01)
*H01G 4/38* (2006.01)
(Continued)

(52) U.S. Cl.
CPC ............... *H01G 4/005* (2013.01); *H01G 4/33* (2013.01); *H01G 4/38* (2013.01); *H01G 9/012* (2013.01); *H01G 9/045* (2013.01); *H01G 9/0425* (2013.01); *H01G 9/055* (2013.01); *H01G 9/07* (2013.01); *H01G 9/15* (2013.01)

(58) Field of Classification Search
CPC ............ H01G 4/12; H01G 4/228; H01G 4/38; H01G 4/33; H01G 4/005; H01G 9/045; H01G 9/055; H01G 9/07
USPC .......... 361/321.2, 303, 304, 328, 306.1, 311, 361/523, 528
See application file for complete search history.

(56) References Cited

U.S. PATENT DOCUMENTS

| | | |
|---|---|---|
| 4,599,788 A | 7/1986 | Love et al. |
| 5,777,839 A | 7/1998 | Sameshima et al. |
| (Continued) | | |

FOREIGN PATENT DOCUMENTS

| | | |
|---|---|---|
| JP | S61-51911 A | 3/1986 |
| JP | S64-127231 U1 | 8/1989 |
| (Continued) | | |

OTHER PUBLICATIONS

International Search Report issued in International Application No. PCT/JP2016/071135, dated Sep. 13, 2013.
(Continued)

*Primary Examiner* — Arun Ramaswamy
(74) *Attorney, Agent, or Firm* — Arent Fox LLP

(57) ABSTRACT

A capacitor having a conductive porous substrate with at least two electrostatic capacitance forming sections, each of the at least two electrostatic capacitance forming sections including a porous portion of the conductive porous substrate, a dielectric layer on the porous portion, and an upper electrode on the dielectric layer. The at least two electrostatic capacitance forming sections are electrically connected in series by the conductive porous substrate.

10 Claims, 24 Drawing Sheets

(51) Int. Cl.
*H01G 4/005* (2006.01)
*H01G 9/045* (2006.01)
*H01G 9/055* (2006.01)
*H01G 9/07* (2006.01)
*H01G 9/042* (2006.01)
*H01G 9/15* (2006.01)
*H01G 9/012* (2006.01)

(56) References Cited

U.S. PATENT DOCUMENTS

| | | |
|---|---|---|
| 5,926,363 A | 7/1999 | Kuriyama |
| 6,040,229 A | 3/2000 | Kuriyama |
| 7,013,561 B2 | 3/2006 | Nakatani et al. |
| 7,793,396 B2 | 9/2010 | Shioga et al. |
| 7,940,516 B2 | 5/2011 | Shioga et al. |
| 2003/0116348 A1 | 6/2003 | Nakatani et al. |
| 2008/0068780 A1 | 3/2008 | Shioga et al. |
| 2010/0321911 A1 | 12/2010 | Shioga et al. |
| 2011/0310530 A1 | 12/2011 | Laor |
| 2012/0281338 A1 | 11/2012 | Lee et al. |

FOREIGN PATENT DOCUMENTS

| | | |
|---|---|---|
| JP | H05135999 A | 6/1993 |
| JP | H07-135124 A | 5/1995 |
| JP | H10-74668 A | 3/1998 |
| JP | H10199755 A | 7/1998 |
| JP | 2000299247 A | 10/2000 |
| JP | 2001-203455 A | 7/2001 |
| JP | 2008-78299 A | 4/2008 |
| JP | 2008193096 A | 8/2008 |
| JP | 2009-295634 A | 12/2009 |
| JP | 2009-295645 A | 12/2009 |
| JP | 2012-517717 A | 8/2012 |

OTHER PUBLICATIONS

Written Opinion of the International Searching Authority issued in International Application No. PCT/JP2016/071135, dated Sep. 13, 2013.

CAPACITOR

CROSS REFERENCE TO RELATED APPLICATIONS

The present application is a continuation of International application No. PCT/JP2016/071135, filed Jul. 19, 2016, which claims priority to Japanese Patent Application No. 2015-157964, filed Aug. 10, 2015, the entire contents of each of which are incorporated herein by reference.

FIELD OF THE INVENTION

The present invention relates to a capacitor.

BACKGROUND OF THE INVENTION

In recent years, with the development of electronic devices having higher performance and a smaller size, a capacitor having a smaller size, a larger capacity, and a lower equivalent series resistance (ESR) has been required. A conductive polymer capacitor using a porous metal foil as an anode and a conductive polymer as a cathode has been known as a capacitor having a smaller size, a larger capacity, and a lower ESR. In general, when a higher electrostatic capacitance is obtained, a dielectric layer is made thinner.

On the other hand, if the dielectric layer of the capacitor is destroyed due to long-term use, inflow of surge or the like, a circuit using the capacitor may be short-circuited. In particular, a capacitor with a dielectric layer made thin to increase the electrostatic capacitance has a low withstand voltage and is in a state of being relatively easily destroyed.

Thus, from the viewpoint of fail-safe, there is known a method of connecting a plurality of capacitors in series so as to prevent the circuit from being short-circuited even when a dielectric layer of one of the capacitors is destroyed. As an element in which a plurality of capacitors are connected in series, a multilayer capacitor in which a dielectric layer and an electrode layer are stacked is known (Patent Document 1). However, the multilayer capacitor as described in Patent Document 1 generates hysteresis characteristics when a ferroelectric is used, and therefore is not necessarily suitable for increasing the capacity in some cases.

Patent Document 1: Japanese Patent Application Laid-Open No. H7-135124
Patent Document 2: Japanese Patent Application Laid-Open No. 2001-203455

SUMMARY OF THE INVENTION

It is conceivable to connect a plurality of conductive polymer capacitors in series in order to obtain a capacitor achieving a small size, a high electrostatic capacitance, a low ESR, and fail safe. When it is desired to obtain a single element having a structure in which a plurality of capacitors are connected in series as described above, it is conceivable that two or more electrostatic capacitance forming sections are formed on a base material, and an upper surface of each electrostatic capacitance forming section is used as a terminal electrode, as in Patent Document 2. However, in this configuration, a reverse voltage is applied to one of the electrostatic capacitance forming sections. Since the conductive polymer capacitor has polarity, the above configuration is not suitable, so that there arises a problem that a sufficient withstand voltage cannot be obtained.

An object of the present invention is to provide a capacitor satisfying all conditions including small size, high electrostatic capacitance, low ESR, nonpolarity, fail safe (i.e., series structure), and an integrated object.

As a result of intensive studies to solve the above problems, the present inventors have found that, when a dielectric layer is formed on a conductive porous substrate, and two or more upper electrodes are formed thereon, it is possible to provide a capacitor satisfying all conditions including small size, high electrostatic capacitance, low ESR, nonpolarity, fail safe (i.e., series structure), and an integrated object.

According to the gist of the present invention, provided is a capacitor having a conductive porous substrate with at least two electrostatic capacitance forming sections including a dielectric layer on a porous portion of the conductive porous substrate, and an upper electrode on the dielectric layer. The at least two electrostatic capacitance forming sections are electrically connected in series by the conductive porous substrate.

According to the present invention, it is possible to provide a capacitor having no polarity and satisfying a fail-safe condition, while simultaneously achieving high electrostatic capacitance and low ESR.

DETAILED DESCRIPTION OF THE INVENTION

Hereinafter, a capacitor of the present invention will be described in detail with reference to the drawings. However, the shapes and arrangements of the capacitor and respective constituent elements according to the present embodiment are not limited to those in the illustrated examples.

Figure 1:
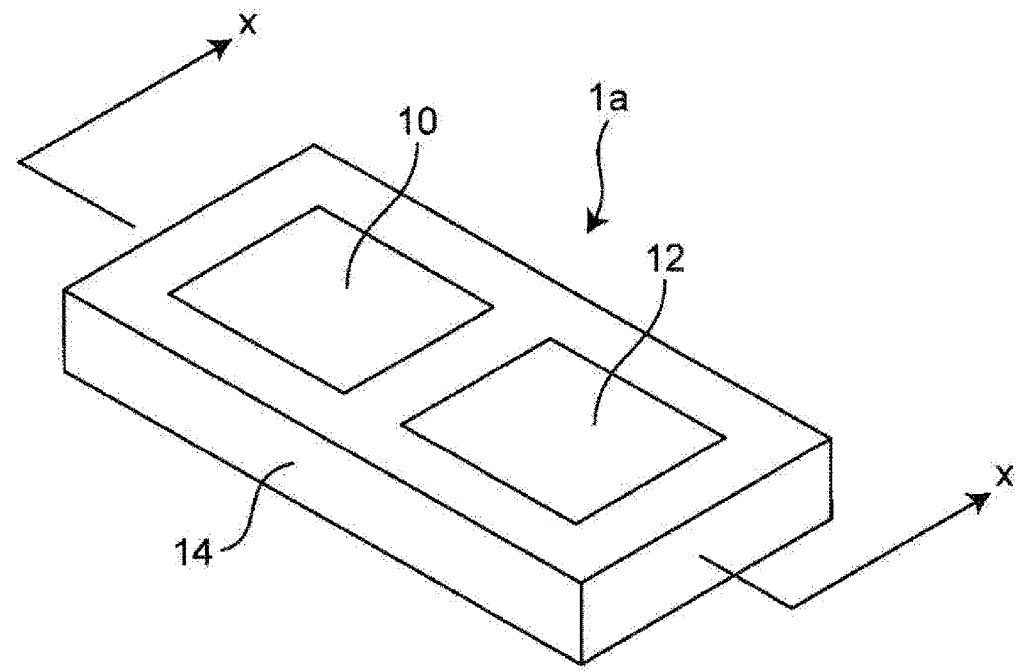
FIG. 1 is a schematic perspective view of a capacitor 1a according to an embodiment of the present invention.
Figure 2:
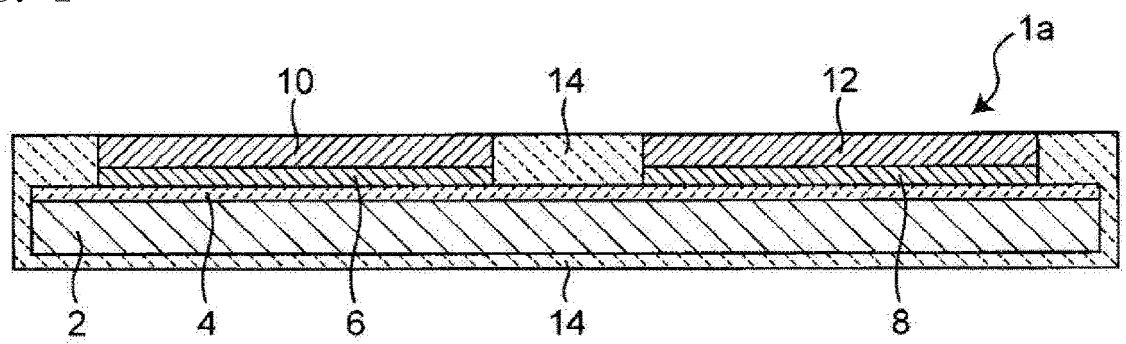
FIG. 2 is a schematic cross-sectional view taken along line x-x of the capacitor 1a shown in FIG. 1.
Figure 3:
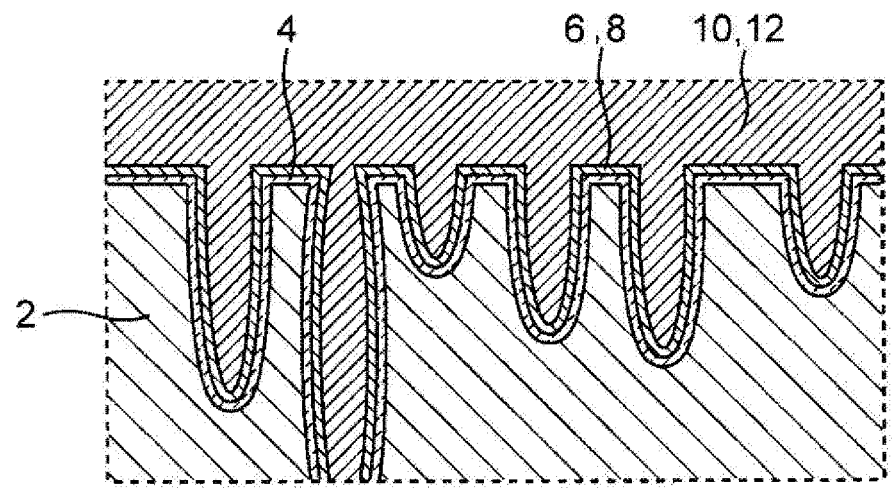
FIG. 3 is a cross-sectional view schematically showing a porous structure of the capacitor 1a shown in FIG. 1.

FIG. 1 is a schematic perspective view of a capacitor 1a according to an embodiment of the present invention, FIG. 2 is a schematic cross-sectional view thereof, and FIG. 3 is a schematic cross-sectional view of a porous portion. As shown in FIGS. 1 and 2, the capacitor 1a of the present embodiment has a substantially rectangular parallelepiped shape, and schematically includes a conductive porous substrate 2, a dielectric layer 4 located on the conductive porous substrate 2, and a first upper electrode 6 and a second upper electrode 8 located on the dielectric layer 4. A first terminal electrode 10 is formed on the first upper electrode 6, and a second terminal electrode 12 is formed on the second upper electrode 8. They are covered with a protective layer 14 such that only top surfaces of the first terminal electrode 10 and the second terminal electrode 12 are exposed. The conductive porous substrate 2, the dielectric layer 4 and the first upper electrode 6 constitute a first electrostatic capacitance forming section. The conductive porous substrate 2, the dielectric layer 4, and the second upper electrode 8 constitute a second electrostatic capacitance forming section. That is, the first electrostatic capacitance forming section and the second electrostatic capacitance forming section are formed on one main surface of one conductive porous substrate 2, which are electrically connected in series by the conductive porous substrate 2. By applying a voltage between the first terminal electrode 10 and the second terminal electrode 12, electric charges can be accumulated in the dielectric layer 4. The conductive porous substrate 2 has a porous portion on the one main surface (the upper main surface in FIG. 2), but the porous portion is not shown in FIG. 2 for simplicity. A schematic cross-sectional view of the porous portion is shown in FIG. 3.

In such a capacitor, all terminals are present on one surface, which is advantageous in terms of reduction in height. In addition, it is advantageous, for example, when a capacitor is embedded in a substrate.

Figure 4:
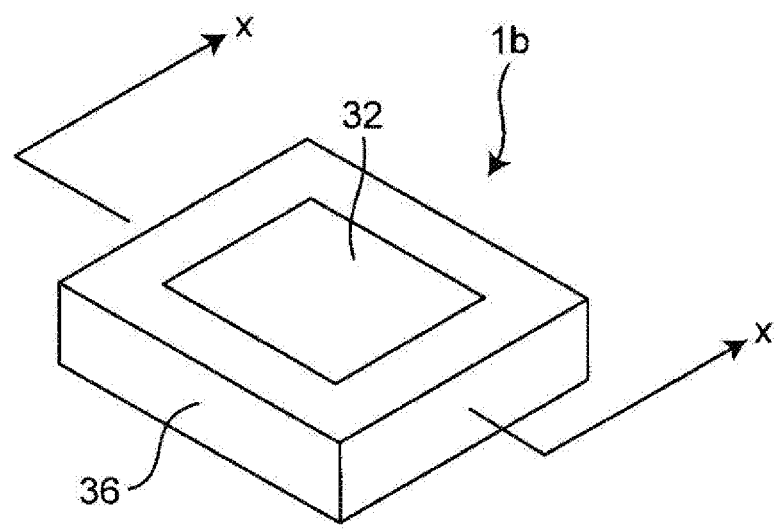
FIG. 4 is a schematic perspective view of a capacitor 1b according to an embodiment of the present invention.
Figure 5:
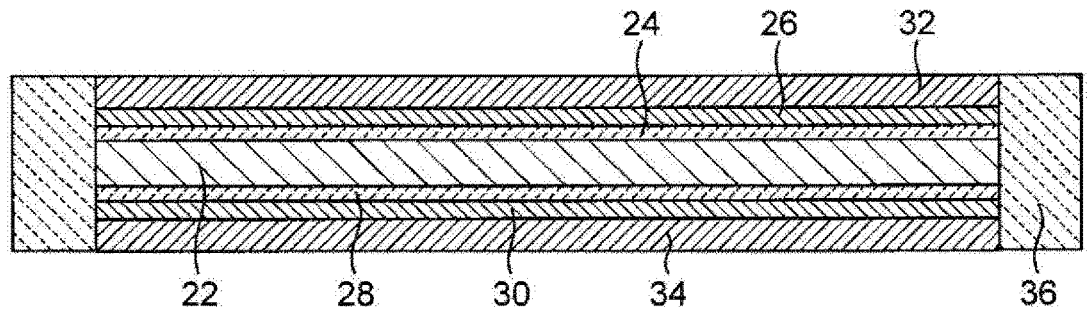
FIG. 5 is a schematic cross-sectional view taken along line x-x of the capacitor 1b shown in FIG. 4.

FIG. 4 is a schematic perspective view of a capacitor 1b according to another embodiment of the present invention, and FIG. 5 is a schematic cross-sectional view thereof. As shown in FIGS. 4 and 5, the capacitor 1b of the present embodiment has a substantially rectangular parallelepiped shape, schematically includes a conductive porous substrate 22, a first dielectric layer 24 located on one main surface of the conductive porous substrate 22, and a first upper electrode 26 located on the first dielectric layer 24, and further includes a second dielectric layer 28 located on another main surface of the conductive porous substrate 22 and a second upper electrode 30 located on the second dielectric layer 28. A first terminal electrode 32 is formed on the first upper electrode 26, and a second terminal electrode 34 is formed on the second upper electrode 30. They are covered with a protective layer 36 such that only top surfaces of the first terminal electrode 32 and the second terminal electrode 34 are exposed. The conductive porous substrate 22, the first dielectric layer 24 and the first upper electrode 26 constitute a first electrostatic capacitance forming section. The conductive porous substrate 22, the second dielectric layer 28, and the second upper electrode 30 constitute a second electrostatic capacitance forming section. That is, the first electrostatic capacitance forming section and the second electrostatic capacitance forming section are formed on the one main surface and the other main surface of the one conductive porous substrate 22, respectively, which are electrically connected in series by the conductive porous substrate 22. By applying a voltage between the first terminal electrode 32 and the second terminal electrode 34, electric charges can be accumulated in the first dielectric layer 24 and the second dielectric layer 28.

In such a capacitor, one electrostatic capacitance forming section can be formed on the entirety of each main surface of the conductive porous substrate, and therefore, the electrostatic capacitance forming section can be enlarged, which is advantageous in that a larger electrostatic capacitance can be obtained.

Figure 6:
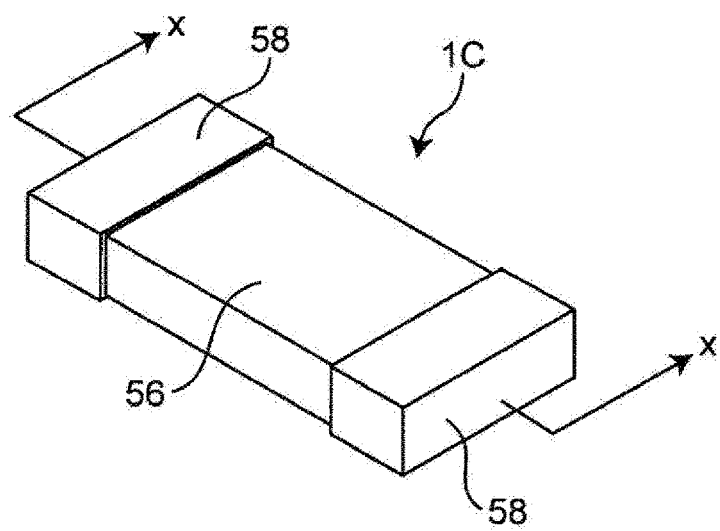
FIG. 6 is a schematic perspective view of a capacitor 1c according to an embodiment of the present invention.
Figure 7:
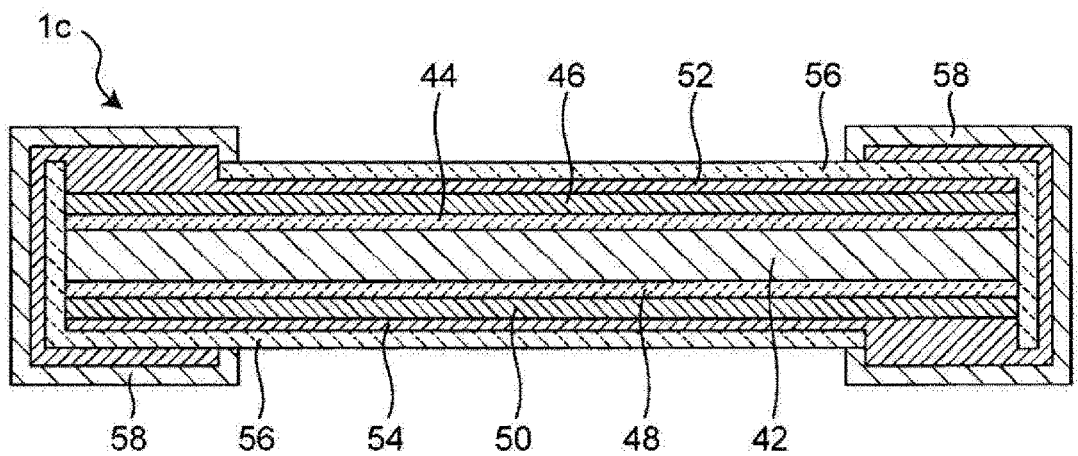
FIG. 7 is a schematic cross-sectional view taken along line x-x of the capacitor 1c shown in FIG. 6.

FIG. 6 is a schematic perspective view of a capacitor 1c according to still another embodiment of the present invention, and FIG. 7 is a schematic cross-sectional view thereof. As shown in FIGS. 6 and 7, the capacitor 1c of the present embodiment has a substantially rectangular parallelepiped shape, schematically includes a conductive porous substrate 42, a first dielectric layer 44 located on one main surface of the conductive porous substrate 42, and a first upper electrode 46 located on the first dielectric layer 44, and further includes a second dielectric layer 48 located on another main surface of the conductive porous substrate 42 and a second upper electrode 50 located on the second dielectric layer 48. A first terminal electrode 52 is formed on the first upper electrode 46, and a second terminal electrode 54 is formed on the second upper electrode 50. The first terminal electrode 52 extends to one end (the left end in FIG. 7) of the capacitor and is formed to cover an end surface. The second terminal electrode 54 extends to another end (the right end in FIG. 7) of the capacitor and is formed to cover another end surface. At the end, the first and second terminal electrodes 52 and 54 and the conductive porous substrate 42 are electrically isolated by the protective layer 56. In addition, the first terminal electrode 52 and the second terminal electrode 54 are electrically isolated from each other by the protective layer 56. At both ends, the terminal electrode portion is covered with another metal layer 58. The conductive porous substrate 42, the first dielectric layer 44 and the first upper electrode 46 constitute a first electrostatic capacitance forming section. The conductive porous substrate 42, the second dielectric layer 48, and the second upper electrode 50 constitute a second electrostatic capacitance forming section. That is, the first electrostatic capacitance forming section and the second electrostatic capacitance forming section are formed on the one main surface and the other main surface of the one conductive porous substrate 42, respectively, which are electrically connected in series by the conductive porous substrate 42. By applying a voltage between the first terminal electrode 52 and the second terminal electrode 54, electric charges can be accumulated in the first dielectric layer 44 and the second dielectric layer 48.

In such a capacitor, a larger electrostatic capacitance can be obtained as in the capacitor 1b, and in addition, the first terminal electrode and the second terminal electrode are present at both ends, which is advantageous in that surface mounting is facilitated.

Figure 8:
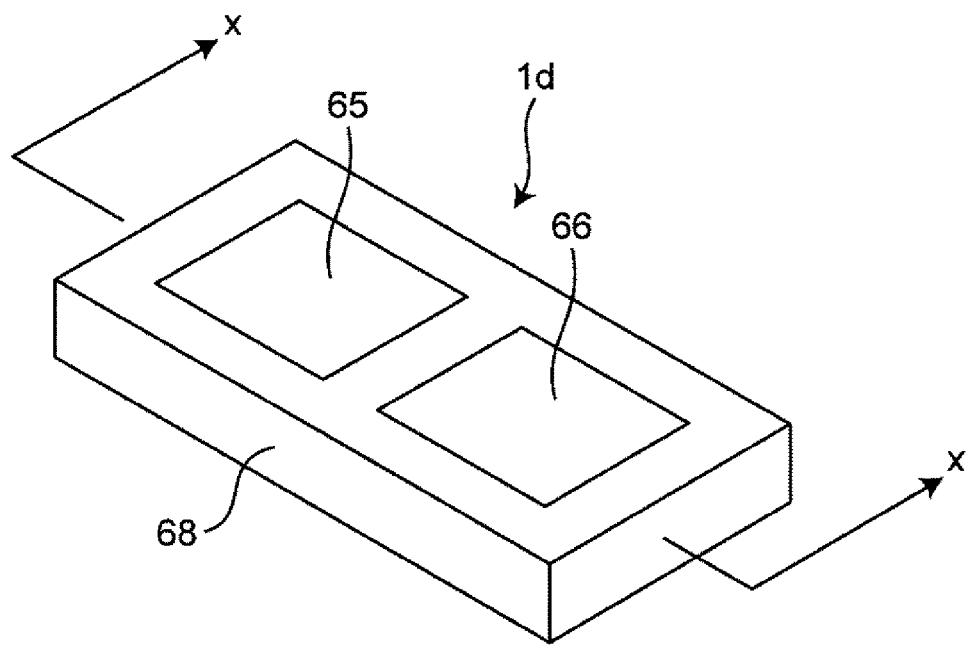
FIG. 8 is a schematic perspective view of a capacitor 1d according to an embodiment of the present invention.
Figure 9:
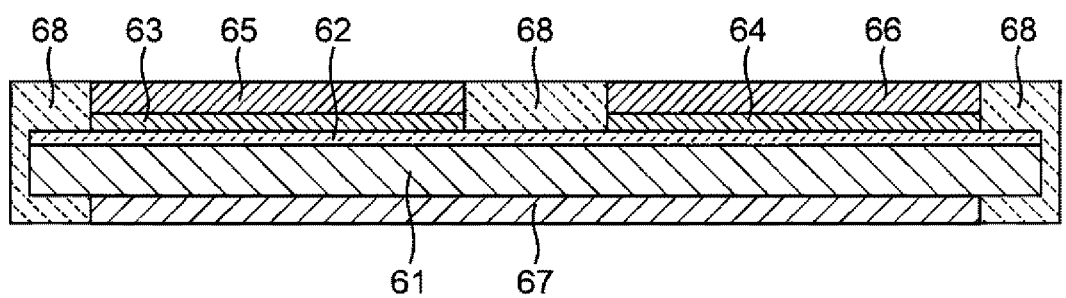
FIG. 9 is a schematic cross-sectional view taken along line x-x of the capacitor 1d shown in FIG. 8.

FIG. 8 is a schematic perspective view of a capacitor 1d according to still another embodiment of the present invention, and FIG. 9 is a schematic cross-sectional view thereof. As shown in FIGS. 8 and 9, the capacitor 1d of the present embodiment has a substantially rectangular parallelepiped shape, and schematically includes a conductive porous substrate 61, a dielectric layer 62 located on the conductive porous substrate 61, and a first upper electrode 63 and a second upper electrode 64 located on the dielectric layer 62. A first terminal electrode 65 is formed on the first upper electrode 63, and a second terminal electrode 66 is formed on the second upper electrode 64. A third terminal electrode 67 is formed on a main surface of the conductive porous substrate 61 on which no dielectric layer is provided. They are covered with a protective layer 68 such that only top surfaces of the first terminal electrode 65, the second terminal electrode 66, and the third terminal electrode 67 are exposed. The conductive porous substrate 61, the dielectric layer 62 and the first upper electrode 63 constitute a first electrostatic capacitance forming section. The conductive porous substrate 61, the dielectric layer 62, and the second upper electrode 64 constitute a second electrostatic capacitance forming section. That is, the first electrostatic capacitance forming section and the second electrostatic capacitance forming section are formed on one main surface of one conductive porous substrate 2, which are electrically connected in series by the conductive porous substrate 61. By applying a voltage between the first terminal electrode 65 and the second terminal electrode 66, electric charges can be accumulated in the dielectric layer 62.

Since a third terminal electrode is present in such a capacitor, it is advantageous in that a common mode noise can be suppressed by connecting the third terminal electrode to the ground.

Figure 10:
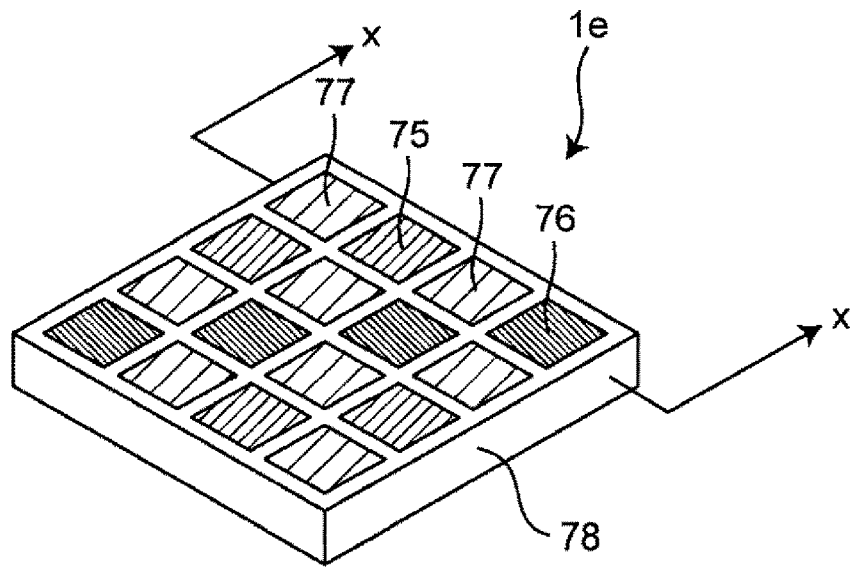
FIG. 10 is a schematic perspective view of a capacitor 1e according to an embodiment of the present invention.
Figure 11:
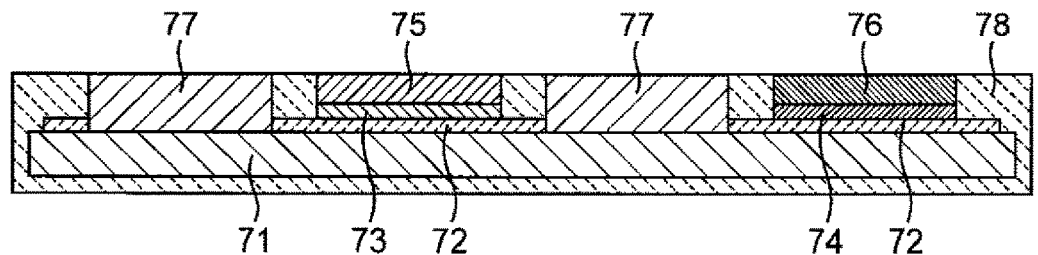
FIG. 11 is a schematic cross-sectional view taken along line x-x of the capacitor 1e shown in FIG. 10.
Figure 12:
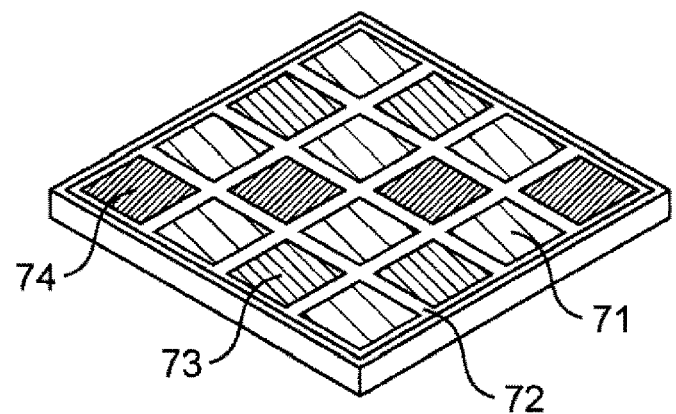
FIG. 12 is a schematic perspective view showing a configuration of the capacitor 1e shown in FIG. 10 excluding a terminal electrode and a protective portion.

FIG. 10 is a schematic perspective view of a capacitor 1e according to still another embodiment of the present invention, FIG. 11 is a schematic cross-sectional view thereof, and FIG. 12 is a schematic perspective view of a configuration excluding a terminal electrode and a protective portion. As shown in FIGS. 10 to 12, the capacitor 1e of the present embodiment has, on one conductive porous substrate 71, a plurality of electrostatic capacitance forming sections and a plurality of terminal electrodes (also referred to as "third terminal electrodes" in this embodiment) drawn out directly from the conductive porous substrate. The capacitor 1e of this embodiment schematically includes a conductive porous substrate 71, a dielectric layer 72 located on the conductive porous substrate 71, and a first upper electrode 73 and a second upper electrode 74 located on the dielectric layer 72. A first terminal electrode 75 is formed on the first upper electrode 73, and a second terminal electrode 76 is formed on the second upper electrode 74. Further, a third terminal electrode 77 directly connected to the conductive porous substrate 71 is formed on the conductive porous substrate 71. They are covered with a protective layer 78 such that only top surfaces of the first terminal electrode 75, the second terminal electrode 76, and the third terminal electrode 77 are exposed. The conductive porous substrate 71, the dielectric layer 72 and the first upper electrode 73 constitute a first electrostatic capacitance forming section. The conductive porous substrate 71, the dielectric layer 72, and the second upper electrode 74 constitute a second electrostatic capacitance forming section. One main surface of the conductive porous substrate 71 has a plurality of sections (or regions) defined by a rectangular lattice, in which any of the first electrostatic capacitance forming section, the second electrostatic capacitance forming section, and the third terminal electrode is provided. The first electrostatic capacitance forming section or the second electrostatic capacitance forming section and the third terminal electrode 77 are alternately arranged. In other words, all sections adjacent to the section having the electrostatic capacitance forming section each have the third terminal electrode, and all sections adjacent to the section having the third terminal electrode each have one of the first electrostatic capacitance forming section and the second electrostatic capacitance forming section. By applying a voltage between the first terminal electrode 75 and the second terminal electrode 76, electric charges can be accumulated in the dielectric layer 72. The arrangement of the first electrostatic capacitance forming section and the second electrostatic capacitance forming section is not limited to the illustrated example, and an arbitrary electrostatic capacitance forming section may be used as one of the first electrostatic capacitance forming section and the second electrostatic capacitance forming section.

The capacitor 1e is used such that two electrostatic capacitance forming sections (the first electrostatic capacitance forming section or the second electrostatic capacitance forming section) are electrically connected in series. That is, one of the first electrostatic capacitance forming section and the second electrostatic capacitance forming section is connected to a positive electrode, and the other is connected to a negative electrode.

Although all terminals of the capacitor 1e are exposed on the capacitor surface, the present invention is not limited thereto, and only an arbitrary terminal may be exposed. For example, all third terminal electrodes may be covered with a protective layer or the like, and not be exposed. Further, only one first terminal electrode and one second terminal electrode may be exposed.

In such a capacitor, a common mode noise can be suppressed as in the case of the capacitor 1d, and in addition, since a plurality of terminals are provided, equivalent series resistance (ESR) and equivalent series inductance (ESL) of the whole capacitor can be reduced, which is advantageous.

Figure 13:
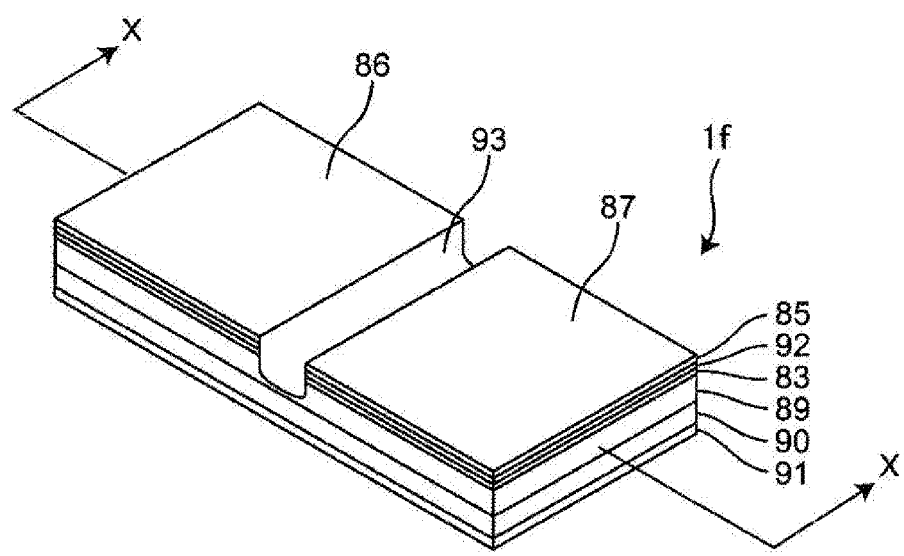
FIG. 13 is a schematic perspective view of a capacitor 1f according to an embodiment of the present invention.
Figure 14:
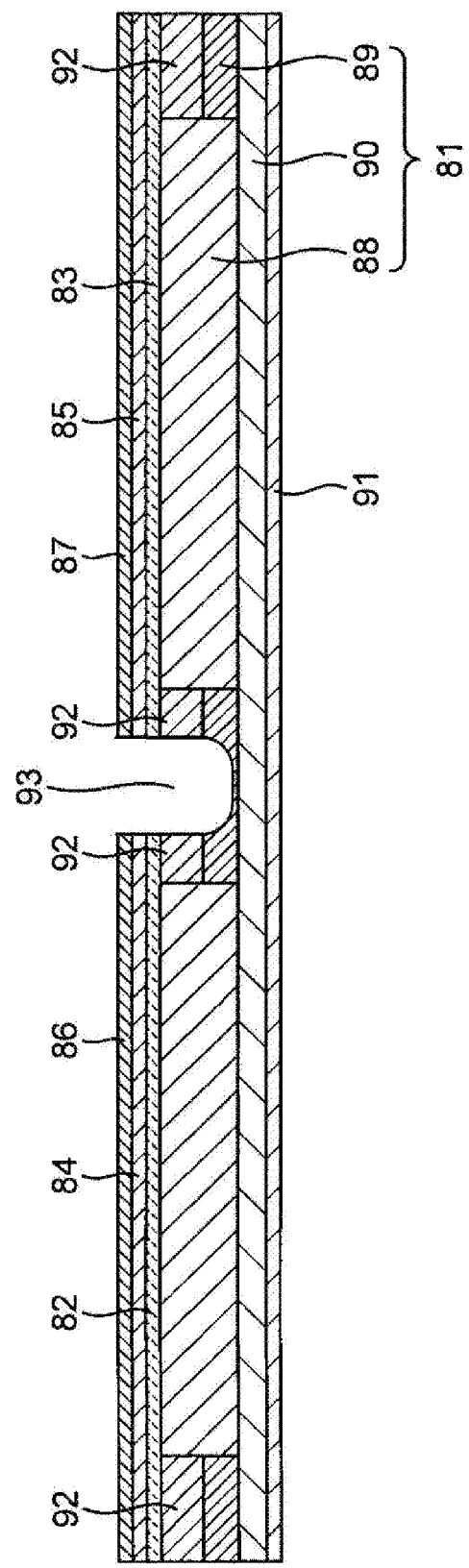
FIG. 14 is a schematic cross-sectional view taken along line x-x of the capacitor 1f shown in FIG. 13.

FIG. 13 is a schematic perspective view of a capacitor 1f according to still another embodiment of the present invention, and FIG. 14 is a schematic cross-sectional view thereof. As shown in FIGS. 13 and 14, the capacitor 1f of the present embodiment schematically includes a conductive porous substrate 81, a first dielectric layer 82 and a second dielectric layer 83 located on the conductive porous substrate 81, a first upper electrode 84 located on the first dielectric layer 82, and a second upper electrode 85 located on the second dielectric layer 83. A first terminal electrode 86 is formed on the first upper electrode 84, and a second terminal electrode 87 is formed on the second upper electrode 85. The conductive porous substrate 81 has a high porosity portion 88 having a relatively high porosity on one principal surface side (the principal surface side on the upper side in the drawing), and a low porosity portion 89 having a relatively low porosity. The conductive porous substrate 81 has a support portion 90 on the other principal surface side (the principal surface side on the lower side in the drawing). That is, the high porosity portion 88 and the low porosity portion 89 constitute one principal surface of the conductive porous substrate 81, and the support portion 90 constitutes the other principal surface of the conductive porous substrate 81. A third terminal electrode 91 is formed on the support portion 90 of the conductive porous substrate 81. An insulating portion 92 is present between the low porosity portion 89 and the dielectric layers 82 and 83 at a terminal end portion of the capacitor 1f of the present embodiment. The conductive porous substrate 81, the first dielectric layer 82, and the first upper electrode 84 constitute a first electrostatic capacitance forming section. The conductive porous substrate 81, the second dielectric layer 83, and the second upper electrode 85 constitute a second electrostatic capacitance forming section. That is, the first electrostatic capacitance forming section and the second electrostatic capacitance forming section are formed on one main surface of one conductive porous substrate 81. The first upper electrode 84 and the first terminal electrode 86 are electrically isolated from the second upper electrode 85 and the second terminal electrode 87 by a groove portion (half-cut portion) 93. The first electrostatic capacitance forming section and the second electrostatic capacitance forming section are electrically connected in series by the conductive porous substrate 81. By applying a voltage between the first terminal electrode 86 and the second terminal electrode 87, electric charges can be accumulated in the first dielectric layer 82 and the second dielectric layer 83.

In such a capacitor, a common mode noise can be suppressed as in the case of the capacitor 1e, and in addition, since a plurality of terminals are provided, equivalent series resistance (ESR) and equivalent series inductance (ESL) of the whole capacitor can be reduced, which is advantageous. In addition, the first terminal electrode and the second terminal electrode are present on one surface, which is advantageous in that surface mounting is facilitated.

Figure 15:
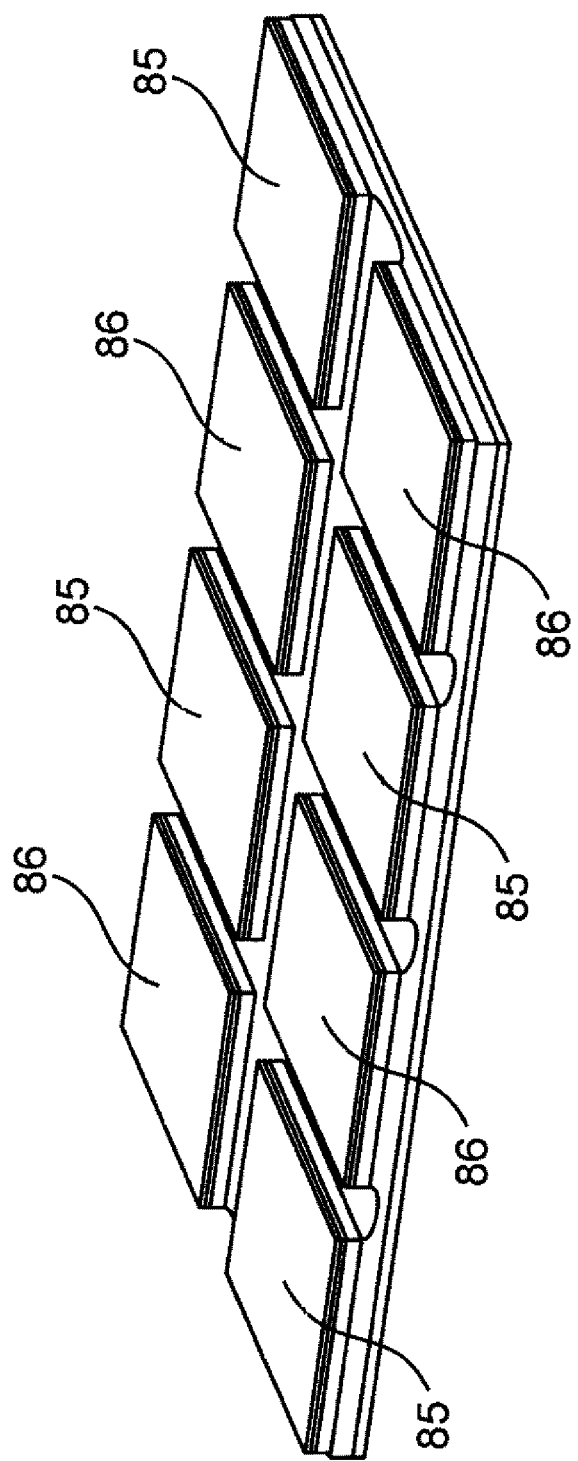
FIG. 15 is a schematic perspective view showing a mode in which a plurality of capacitors if shown in FIG. 13 are coupled.

Although the capacitor 1f has two electrostatic capacitance forming sections, the present invention is not limited to this mode. For example, the capacitor according to the present invention may be configured such that four capacitors 1f as shown in FIG. 15 are gathered. When the configuration in which the plurality of capacitors 1f are present is adopted, it is possible to offset generated magnetic fields, reduce inductance, and improve high frequency performance.

The half-cut portion may be filled with an insulating material. The insulating material is not particularly limited, and for example, may be an insulating glass material, an insulating ceramic material, or an insulating resin material. The insulating material is preferably the insulating resin material, specifically an epoxy resin, a polyimide resin, or a fluororesin, more preferably the epoxy resin. By filling the half-cut portion with the insulating material, the strength of the capacitor is improved, and the failure rate can be reduced.

Although the capacitor 1f has the third terminal electrode 91, the third terminal electrode 91 may be replaced with an insulating resin. The insulating resin is specifically an epoxy resin, a polyimide resin, or a fluororesin, preferably the epoxy resin. By replacing the third terminal electrode with the insulating resin, it is possible to reduce an influence due to a mounting impact of the electrostatic capacitance forming section, and to reduce the failure rate.

In the capacitor of the above embodiment, the material and configuration of the conductive porous substrate are not limited as long as it has a porous portion and its surface is conductive. For example, the conductive porous substrate may be a porous metal substrate formed from a conductive metal or may be one in which a conductive layer is formed on a surface of a non-conductive material such as a porous silica material, a porous carbon material, or a porous ceramic sintered body. Due to the use of the porous substrate, the surface area of the substrate is increased, i.e., a contact area between the substrate and a dielectric layer can be increased, so that a larger electrostatic capacitance can be obtained.

In a preferred embodiment, the conductive porous substrate is a porous metal substrate.

Examples of metal constituting the porous metal substrate include metals such as aluminum, tantalum, nickel, copper, titanium, niobium and iron, and alloys such as stainless steel and duralumin. The porous metal substrate is preferably an aluminum porous substrate.

The conductive porous substrate may have many pores on only one or both principal surfaces according to a desired capacitor structure. The presence position, number of installations, size, shape, etc. of the porous portion are not particularly limited.

The porosity of the porous portion of the conductive porous substrate can be preferably not less than 20%, more preferably not less than 30%, further preferably not less than 50%, even further preferably not less than 60%. By increasing the porosity, the electrostatic capacitance of the capacitor can be increased. From the viewpoint of enhancing mechanical strength, the porosity of the porous portion can be preferably not more than 90%, more preferably not more than 80%.

In this specification, the term "porosity" refers to the proportion occupied by voids in the conductive porous substrate at a predetermined position. The porosity can be measured as follows. Although the voids of the porous portion can be finally filled with a dielectric layer, an upper electrode, etc. in the process of manufacturing the capacitor, the above-described "porosity" is calculated without taking the thus filled material into consideration and with considering the filled portion as the void.

The conductive porous substrate is processed by a FIB (Focused Ion Beam) micro sampling method to be processed into a slice sample having a thickness of not more than 60 nm. A predetermined region (3 μm×3 μm) of the slice sample is measured by STEM (Scanning Transmission Electron Microscope)-EDS (Energy Dispersive X-ray spectrometry) mapping analysis. The area where metal of the conductive porous substrate is present is obtained in a mapping measurement visual field. Then, the porosity can be calculated from the following equation. This measurement is made at any three locations, and the average value for the measurement values is regarded as the porosity.

Porosity (%)=((measured area−area where metal of substrate is present)/measured area)×100

Although the porous portion is not particularly limited, the porous portion preferably has an expanded surface ratio of not less than 30 times and not more than 10,000 times, more preferably not less than 50 times and not more than 5,000 times, for example, not less than 300 times and not more than 600 times. Herein, the expanded surface ratio refers to a surface area per unit projected area. The surface area per unit projected area can be obtained from the amount of nitrogen adsorption at a liquid nitrogen temperature with the use of a BET specific surface area measurement apparatus.

In addition, the expanded surface ratio can also be obtained by the following method. A STEM (scanning transmission electron microscope) image of a cross section of the sample (a cross section obtained by cutting in the thickness direction) is taken over the entire area in width X and thickness (height) T directions (multiple images may be connected when it is not possible to take the image at one time). The total path length L of a pore surface (the total length of the pore surface) at the obtained cross section of the width X×the height T is measured. Here, the total path length of the pore surface in a square prism region with the cross section of the width X×the height T as a side surface and a porous substrate surface as a bottom surface is denoted by LX. In addition, a bottom area of this square prism is denoted by $X^2$. Accordingly, the expanded surface ratio can be obtained as $LX/X^2=L/X$.

In one embodiment, the conductive porous substrate has a porous portion (hereinafter also referred to as "high porosity portion") and a low porosity portion like the capacitor $1f$.

The low porosity portion is a region having a smaller porosity than the high porosity portion. In the low porosity portion, pores may not be present. From the viewpoint of enhancing mechanical strength, the porosity of the low porosity portion is preferably not more than 60% of the porosity of the high porosity portion, more preferably not more than 50% of the porosity of the high porosity portion. For example, the porosity of the low porosity portion is preferably not more than 20%, more preferably not more than 10%. The porosity of the low porosity portion may be 0%. The low porosity portion contributes to the enhancement of the mechanical strength of the capacitor.

The low porosity portion is not an indispensable element. When the low porosity portion is provided, the presence position, number of installations, size, shape, etc. of the low porosity portion are not particularly limited.

In the capacitor of the above embodiment, a dielectric layer (a first dielectric layer or a second dielectric layer) is formed on the conductive porous substrate, specifically, on the porous portion. The shape of the dielectric layer is not particularly limited, and various shapes can be made according to the purpose. For example, like the capacitor $1a$, the dielectric layer 4 may be formed on one main surface of the conductive porous substrate 2. Further, like the capacitor $1b$, the dielectric layers 24 and 28 may be formed on both main surfaces of the conductive porous substrate 22. Furthermore, like the capacitor $1e$, the dielectric layer 72 may be formed only on a portion of the conductive porous substrate.

The material for forming the dielectric layer is not particularly limited as long as the material has an insulating property, and preferably, examples thereof include: metal oxides such as $AlO_x$ (for example, $Al_2O_3$), $SiO_x$ (for example, $SiO_2$), $AlTiO_x$, $SiTiO_x$, $HfO_x$, $TaO_x$, $ZrO_x$, $HfSiO_x$, $ZrSiO_x$, $TiZrO_x$, $TiZrWO_x$, $TiO_x$, $SrTiO_x$, $PbTiO_x$, $BaTiO_x$, $BaSrTiO_x$, $BaCaTiO_x$, and $SiAlO_x$; metal nitrides such as $AlN_x$, $SiN_x$, and $AlScN_x$; and metal oxynitrides such as $AlO_xN_y$, $SiO_xN_y$, $HfSiO_xN_y$, and $SiC_xONz$. $AlO_x$, $SiO_x$, $SiO_xN_y$, and $HfSiO_x$ are preferred, and $AlO_x$ (typically, $Al_2O_3$) is more preferred. It is to be noted that the above formulas are merely intended to represent the constitutions of the materials, but not intended to limit the compositions. More specifically, x, y, and z attached to O and N may have any value more than 0, and the respective elements including the metal elements may have any presence proportion.

The thickness of the dielectric layer is not particularly limited, and for example, preferably not less than 5 nm and not more than 100 nm, more preferably not less than 10 nm and not more than 50 nm. When the thickness of the dielectric layer is adjusted to not less than 5 nm, it is possible to enhance the insulating property, thereby making it possible to further reduce a leakage current. In addition, when the thickness of the dielectric layer is adjusted to not more than 100 nm, a larger electrostatic capacitance can be obtained.

The dielectric layer is preferably formed by a gas phase method, for example, a vacuum deposition method, a chemical vapor deposition (CVD) method, a sputtering method, an atomic layer deposition (ALD) method, a pulsed laser deposition (PLD) method, or the like. In particular, when a substrate is a porous substrate, a more homogeneous and denser film can be formed even in deep microscopic regions of pores, and therefore, the CVD method or the ALD method is more preferred, and the ALD method is particularly preferred. Due to the use of the gas phase method, particularly the ALD method as described above, the insulating property of the dielectric layer can be further enhanced, and the electrostatic capacitance of the capacitor can be further increased.

In the capacitor of the above embodiment, an upper electrode (a first upper electrode or a second upper electrode) is formed on the dielectric layer.

The material for constituting the upper electrode is not particularly limited as long as the material is conductive, and examples thereof include Ni, Cu, Al, W, Ti, Ag, Au, Pt, Zn, Sn, Pb, Fe, Cr, Mo, Ru, Pd, and Ta and alloys thereof, e.g., CuNi, AuNi, AuSn, and metal nitrides and metal oxynitrides such as TiN, TiAlN, TiON, TiAlON, and TaN, and conductive polymers (for example, PEDOT (poly(3,4-ethylenedioxythiophene)), polypyrrole, polyaniline). TiN or TiON is preferred, and TiN is more preferred.

The thickness of the upper electrode is not particularly limited, and for example, preferably not less than 3 nm, more preferably not less than 10 nm. When the thickness of the upper electrode is adjusted to not less than 3 nm, the resistance of the upper electrode itself can be reduced.

Although not particularly limited, the upper electrode can be formed by a method such as an ALD method, a chemical vapor deposition (CVD) method, plating, bias sputtering, a Sol-Gel method, or conductive polymer filling. When a substrate is a porous substrate, a more homogeneous and denser film can be formed even in deep microscopic regions of pores, and therefore, the upper electrode is preferably formed by the ALD method.

In an embodiment, when the substrate is a porous substrate, a conductive film is formed by the ALD method, and a conductive substance, preferably a substance having a lower electrical resistance, may be filled in pores from above the conductive film by the ALD method or another method. By adopting such a configuration, it is possible to efficiently obtain a higher electrostatic capacitance density and a lower ESR.

In the capacitor of the above embodiment, a terminal electrode (a first terminal electrode or a second terminal electrode) is formed on the upper electrode.

In the capacitor $1d$ and the capacitor $1e$ of the above embodiment, a terminal electrode (third terminal electrode)

directly connected to the conductive porous substrate is formed on the conductive porous substrate.

The material for constituting the terminal electrode is not particularly limited, and examples thereof include metals such as Ag, Pd, Ni, Cu, Sn, Au, and Pb and alloys thereof. The materials for constituting the first to third terminal electrodes may be the same or different. The method for forming the terminal electrode is not particularly limited, and for example, electrolytic plating, electroless plating, a CVD method, vapor deposition, sputtering, baking of a conductive paste or the like can be used. Electrolytic plating or electroless plating is preferred.

In an embodiment (for example, in the capacitor 1*f*), an insulating portion may be provided at a terminal end portion of the capacitor or the like. By arranging the insulating portion, it is possible to prevent a short circuit between the upper electrode and the conductive porous substrate arranged thereon.

In the capacitor 1*f*, although the insulating portion is present on an entire surface of the low porosity portion, the present invention is not limited thereto, and the insulating portion may be present only in a portion of the low porosity portion, or may be present on the high porosity portion beyond the low porosity portion.

Further, in the capacitor 1*f*, although the insulating portion is located between the low porosity portion and the dielectric layer, the present invention is not limited thereto. The insulating portion may be located between the conductive porous substrate and the upper electrode, and, for example, may be located between the dielectric layer and the upper electrode.

The material for forming the insulating portion is not particularly limited as long as the material has an insulating property, and when the ALD method is used later, a resin having heat resistance is preferred. As the insulating material for forming the insulating portion, various glass materials, ceramic materials, polyimide resins, and fluorine resins are preferred.

The thickness of the insulating portion is not particularly limited, and from the viewpoint of more reliably preventing end surface discharge and preventing a short circuit between electrodes during separation into individual components, the thickness is preferably not less than 1 μm, and for example, may be not less than 5 μm or not less than 10 μm. From the viewpoint of reducing the height of the capacitor, the thickness of the insulating portion is preferably not more than 100 μm, and for example, may be not more than 50 μm or not more than 20 μm.

In the capacitor of the above embodiment, a protective portion is formed except for the top surfaces of the first to third terminal electrodes (that is, in the terminal electrode, the surface facing the surface on the conductive porous substrate side), that is, such that only the top surfaces of the first to third terminal electrodes are exposed.

The material for constituting the protective portion is not particularly limited as long as the material has an insulating property, and examples thereof may include an insulating inorganic material, such as insulating ceramic or glass, or an insulating organic material such as resin.

The method for forming the protective portion is not particularly limited, and a dispenser, plating, lamination, a CVD method, vapor deposition, sputtering, screen printing, ink jetting, or the like can be used.

Another metal layer such as plating may be formed on the first terminal electrode, the second terminal electrode, and the third terminal electrode. As another metal layer, a single layer or a plurality of layers may be formed. By forming another metal layer, it is possible to suppress solder erosion and to improve solderability.

Examples of the material for constituting another metal layer include metals such as Ag, Pd, Ni, Cu, Sn, Au, and Pb and alloys thereof. The method for forming another metal layer is not particularly limited, and for example, electrolytic plating, electroless plating, a CVD method, vapor deposition, sputtering, baking of a conductive paste or the like can be used. Electrolytic plating or electroless plating is preferred. For example, Sn and Ni layers can be formed.

The capacitor of the present invention has no polarity. Although such a capacitor has no polarity, the electrostatic capacitance can be increased, and, at the same time, the ESR can be lowered. Since the plurality of electrostatic capacitance forming sections are electrically connected in series, even when a dielectric layer of one of the electrostatic capacitance forming sections is destroyed, it is possible to prevent the entire capacitor element from being short-circuited.

Although the capacitors 1*a*, 1*b*, 1*c*, 1*d*, 1*e* and 1*f* of the above embodiment have been described above as the capacitors according to the present invention, the present invention is not limited thereto, and various modifications are possible.

For example, in the capacitor according to the present invention, layers other than the layers described in the above embodiment may be present between the respective layers, for example, between the conductive porous substrate and the dielectric layer, or between the dielectric layer and the upper electrode.

In the capacitor described above, the terminal electrodes are formed on the conductive porous substrate or the upper electrode, but are not indispensable elements and may be omitted.

In the capacitor 1*e*, the first electrostatic capacitance forming section or the second electrostatic capacitance forming section, and the third terminal electrode are alternately present, but the present invention is not limited thereto. The first electrostatic capacitance forming section or the second electrostatic capacitance forming section and the third terminal electrode may be present in an arbitrary section.

As described above, the capacitor according to the present invention has two or more electrostatic capacitance forming sections, which are electrically connected in series. Therefore, a fail-safe condition is satisfied while simultaneously achieving high electrostatic capacitance and low ESR. Further, the capacitor according to the present invention has a high withstand voltage because the electrostatic capacitance forming sections are electrically connected in series. Furthermore, the capacitor according to the present invention has no polarity and can connect any electrode (the first terminal electrode or the second terminal electrode in the above embodiment) to the negative electrode side or the positive electrode side. Accordingly, when the capacitor according to the present invention is connected to an electronic component such as a circuit, it is not necessary to confirm the polarity, and the mounting operation is simple. In addition, problems such as failure of the capacitor and short circuit of the circuit due to mounting with reversed polarity do not occur.

EXAMPLES

Example 1

Manufacture of Capacitor 1a

Figure 16A:
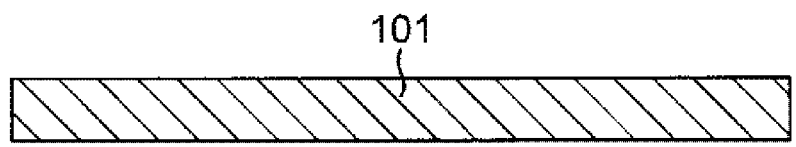
FIGS. 16a to 16d are schematic cross-sectional views for describing manufacture of a capacitor of Example 1.

As a conductive porous substrate, an aluminum etching foil 101 having a porous portion was prepared (FIG. 16a).

Figure 16B:

Then, an AlOx layer 102 as a dielectric layer was formed with a thickness of 20 nm over the entire one main surface of the conductive porous substrate by the ALD method (FIG. 16b).

Figure 16C:
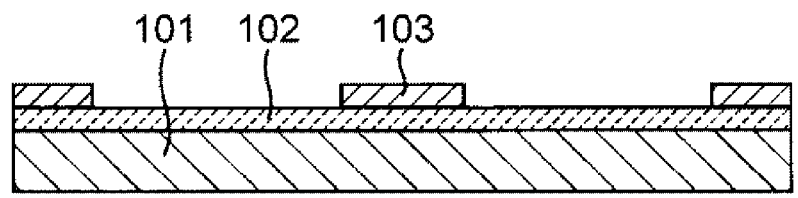
Figure 16D:
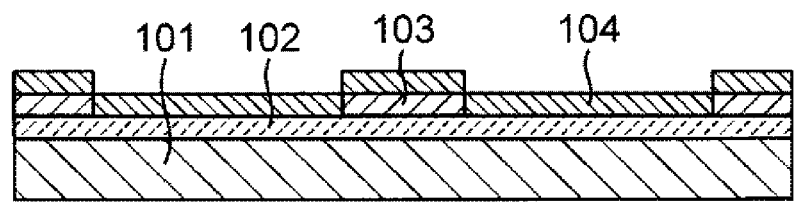

Then, a mask 103 was formed by screen-printing a polyimide resin on the dielectric layer 102 (FIG. 16c), and subsequently a TiN layer 104 as an upper electrode was formed with a thickness of 20 nm on the entire surface of the substrate by the ALD method (FIG. 16d).

Figure 16E:
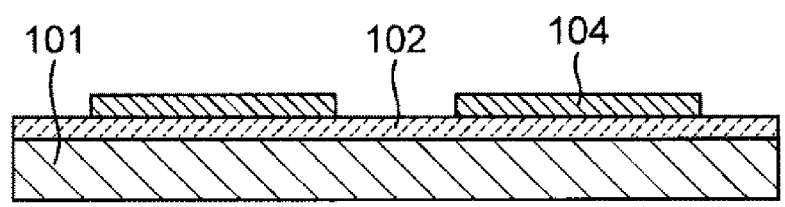
FIGS. 16e to 16h are schematic cross-sectional views for describing manufacture of the capacitor of Example 1.
Figure 16F:
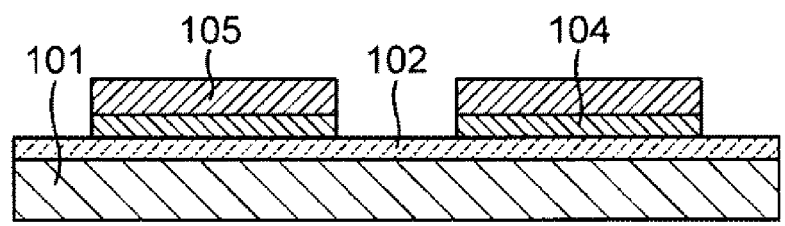

Then, the mask 103 was removed (FIG. 16e), and a copper layer 105 as a terminal electrode was formed on the upper electrode 104 by plating (FIG. 16f).

Figure 16G:
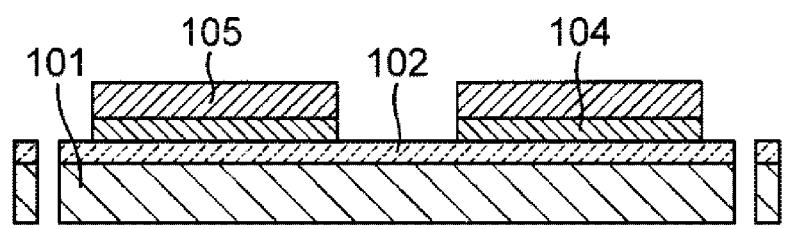
Figure 16H:
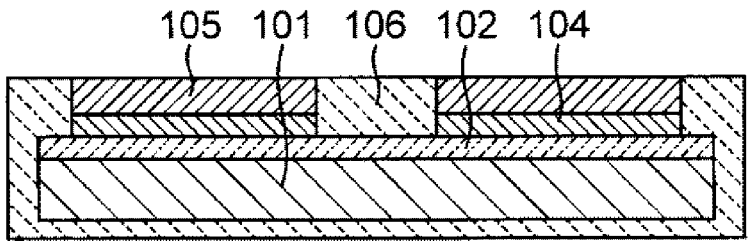

Finally, the substrate was cut with a laser to be cut into respective elements (FIG. 16g), a glass layer 106 as a protective layer was formed by the CVD method, and a capacitor of Example 1 having a structure shown in FIGS. 1 and 2 was obtained.

Example 2

Manufacture of Capacitor 1b

Figure 17A:
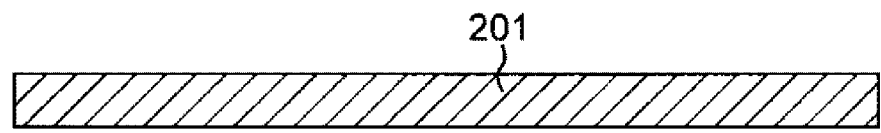
FIGS. 17a to 17c are schematic cross-sectional views for describing manufacture of a capacitor of Example 2.

As a conductive porous substrate, an aluminum etching foil 201 having porous portions on both main surfaces was prepared (FIG. 17a).

Figure 17B:
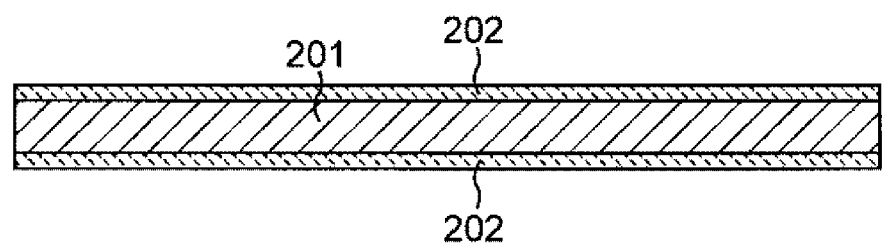
Figure 17C:
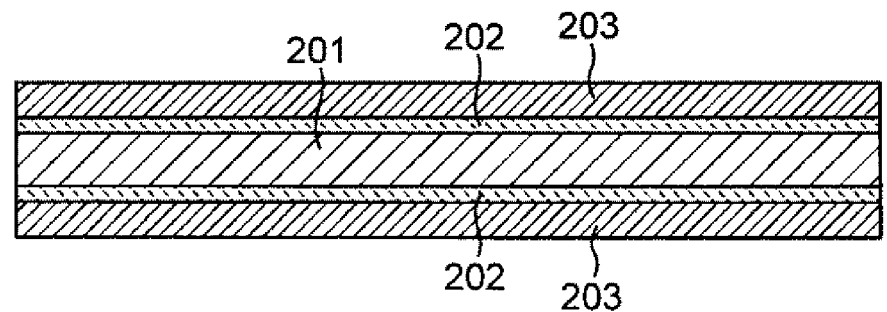
Figure 17D:
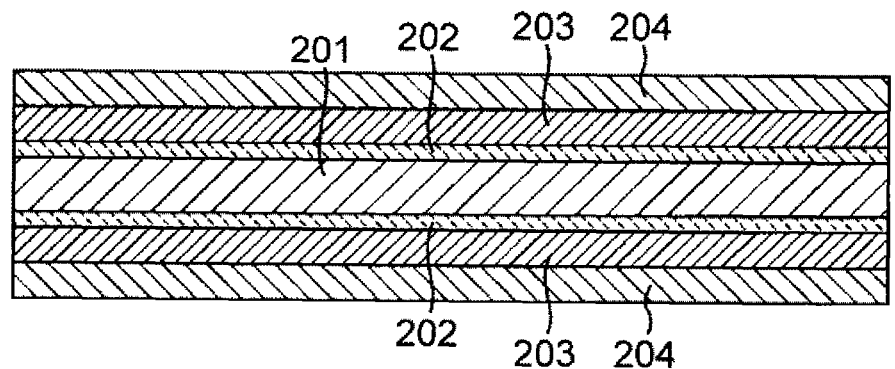
FIGS. 17d to 17f are schematic cross-sectional views for describing manufacture of the capacitor of Example 2.

Then, an AlOx layer 202 as a dielectric layer was formed with a thickness of 20 nm on the entire both main surfaces of the aluminum etching foil by the ALD method (FIG. 17b), and subsequently a TiN layer 203 as an upper electrode was formed with a thickness of 20 nm (FIG. 17c). Then, a copper layer 204 as a terminal electrode was formed on the upper electrode 203 by plating (FIG. 17d).

Figure 17E:
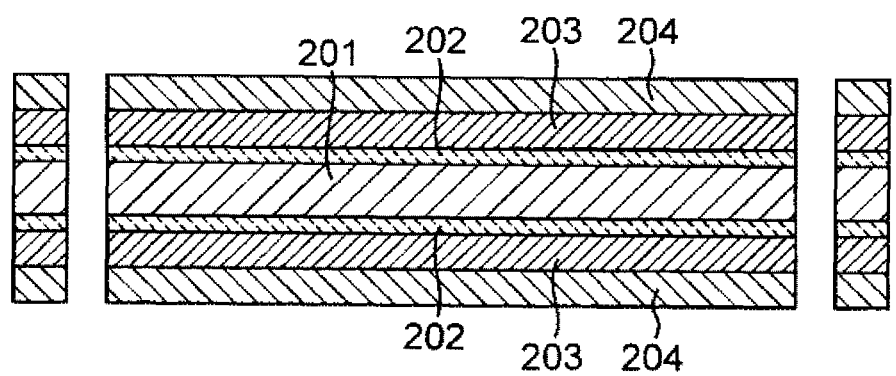
Figure 17F:
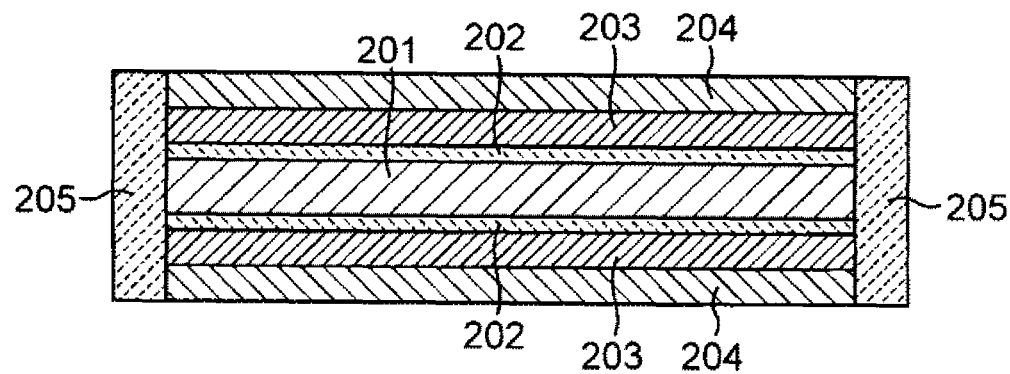

Finally, the substrate was cut with a laser to be cut into respective elements (FIG. 17e), a glass layer 205 as a protective layer was formed around the elements (FIG. 17f), and a capacitor of Example 2 having a structure shown in FIGS. 4 and 5 was obtained.

Example 3

Manufacture of Capacitor 1c

Figure 18A:
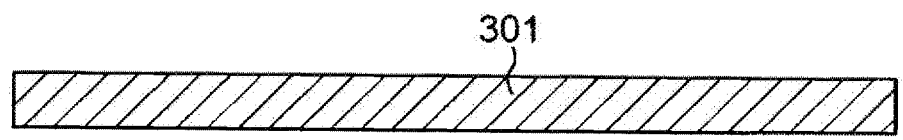
FIGS. 18a to 18c are schematic cross-sectional views for describing manufacture of a capacitor of Example 3.

As a conductive porous substrate, an aluminum etching foil 301 having porous portions on both main surfaces was prepared (FIG. 18a).

Figure 18B:
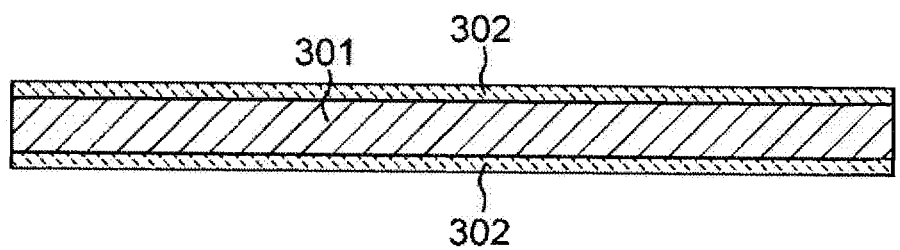
Figure 18C:
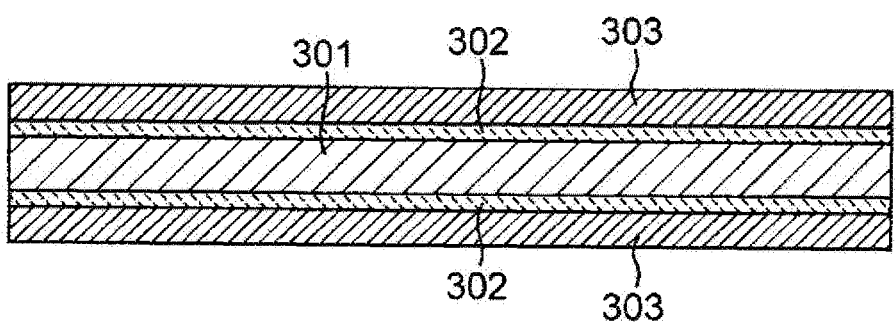
Figure 18D:
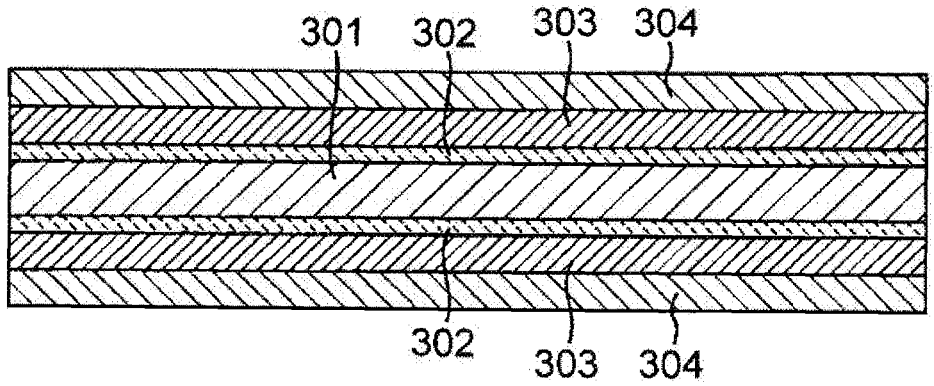
FIGS. 18d to 18f are schematic cross-sectional views for describing manufacture of the capacitor of Example 3.

Then, an AlOx layer 302 as a dielectric layer was formed with a thickness of 20 nm on the entire both main surfaces of the aluminum etching foil 301 by the ALD method (FIG. 18b), and subsequently a TiN layer 303 as an upper electrode was formed with a thickness of 20 nm (FIG. 18c). Then, a copper layer 304 as a lead electrode was formed on the upper electrode 303 by plating (FIG. 18d).

Figure 18E:
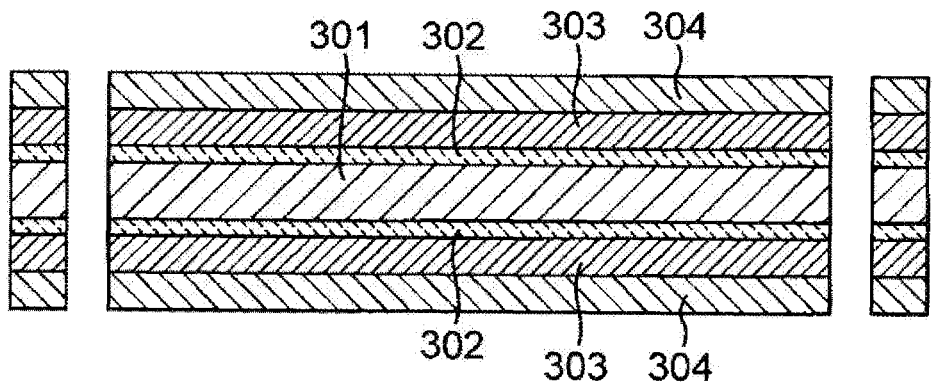
Figure 18F:
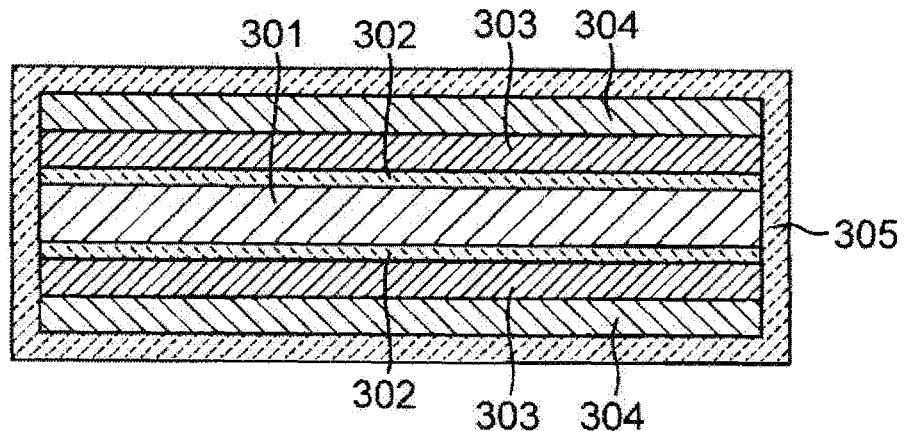

Subsequently, the substrate was cut with a laser to be cut into respective elements (FIG. 18e), and a glass layer 305 as a protective layer was formed around the elements (FIG. 18f).

Figure 18G:
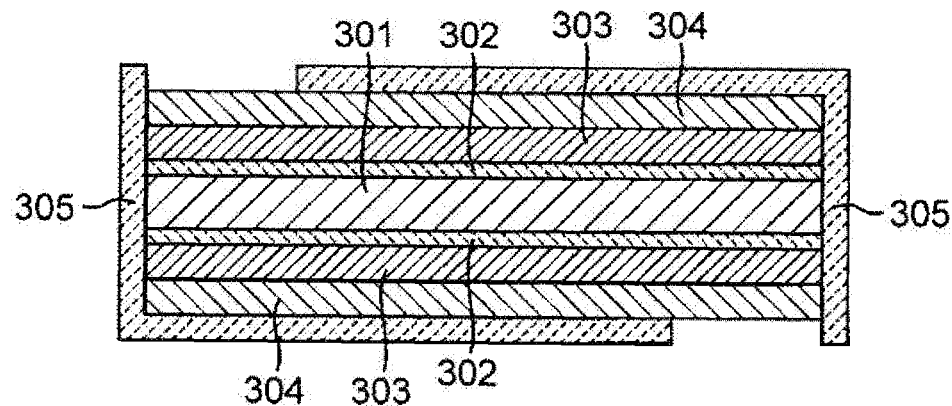
FIGS. 18g to 18i are schematic cross-sectional views for describing manufacture of the capacitor of Example 3.
Figure 18H:
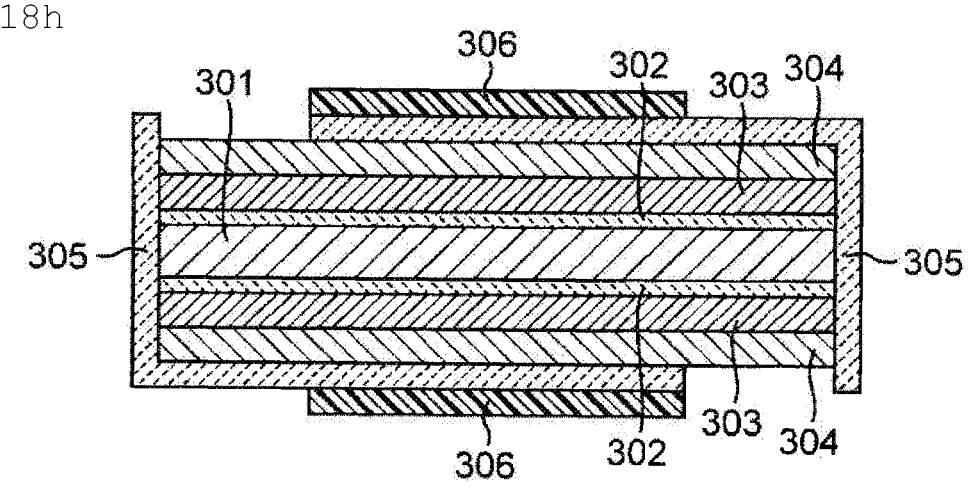

Subsequently, a portion of the protective layer 305 was removed (FIG. 18g), and further a plating resist 306 was formed on a portion of the protective layer 305 (FIG. 18h).

Figure 18I:
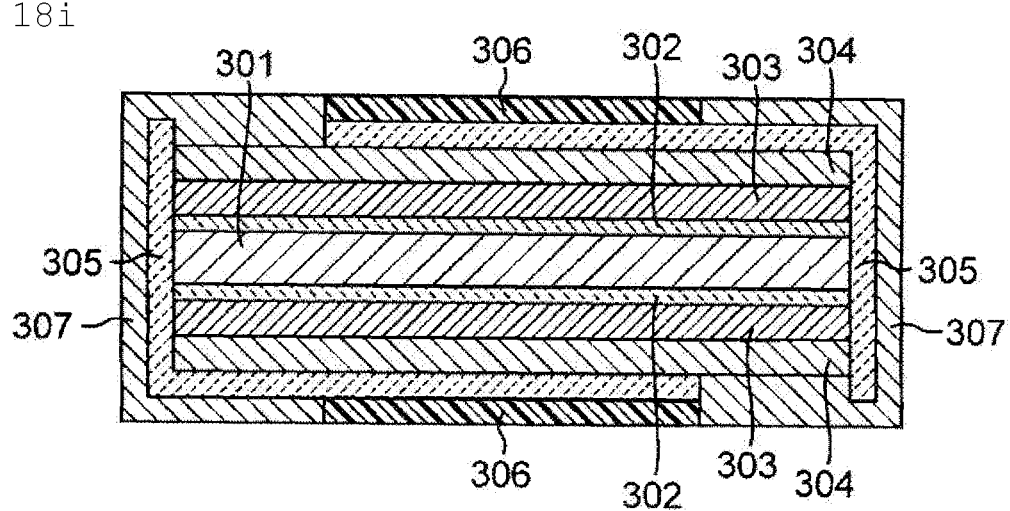

Finally, a copper layer 307 as a terminal electrode was formed on the lead electrode 304 and the protective layer 305 by electroless plating (FIG. 18i), and a capacitor of Example 3 having a structure similar to the structure shown in FIGS. 6 and 7 was obtained (this example has a plating resist).

Example 4

Manufacture of Capacitor 1d

Figure 19A:
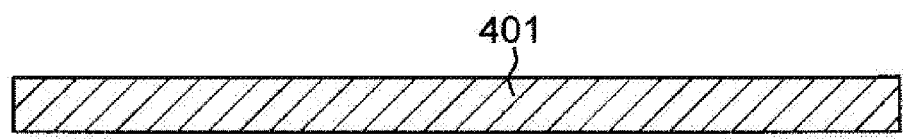
FIGS. 19a to 19c are schematic cross-sectional views for describing manufacture of a capacitor of Example 4.

As a conductive porous substrate, an aluminum etching foil 401 having a porous portion was prepared (FIG. 19a).

Figure 19B:
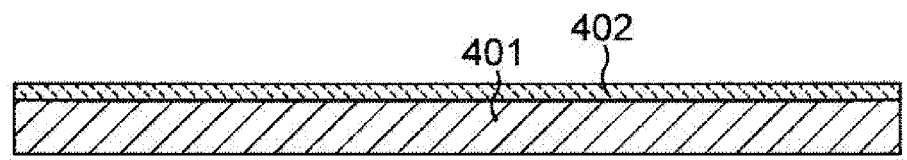

Then, an AlOx layer 402 as a dielectric layer was formed with a thickness of 20 nm over the entire one main surface of the conductive porous substrate by the ALD method (FIG. 19b).

Figure 19C:
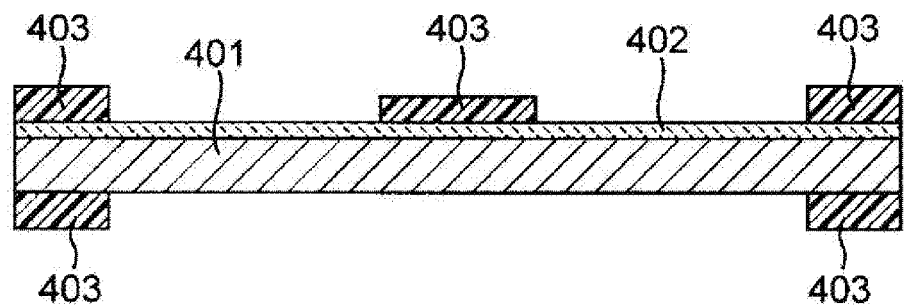
Figure 19D:
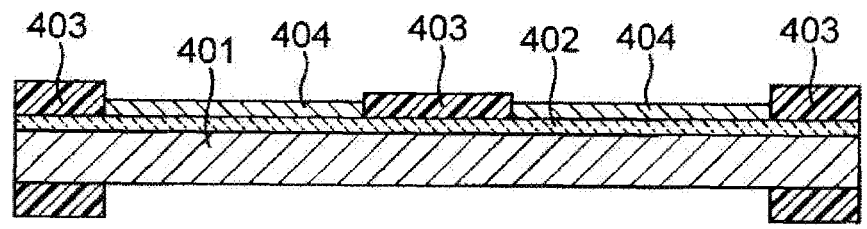
FIGS. 19d to 19f are schematic cross-sectional views for describing manufacture of the capacitor of Example 4.

Then, a mask 403 was formed by screen-printing a polyimide resin on the dielectric layer 402 (FIG. 19c), and subsequently a TiN layer 404 as an upper electrode was formed with a thickness of 20 nm on the entire top surface of the substrate by the ALD method (FIG. 19d).

Figure 19E:
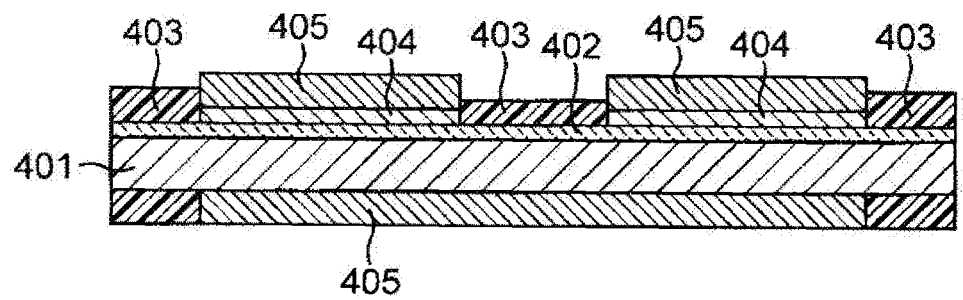

Then, a copper layer 405 as a terminal electrode was formed on the upper electrode 404 and a back surface of the conductive porous substrate 401 by plating (FIG. 19e).

Figure 19F:
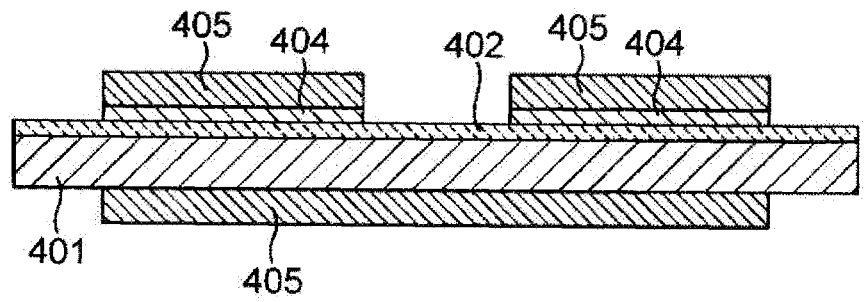
Figure 19G:
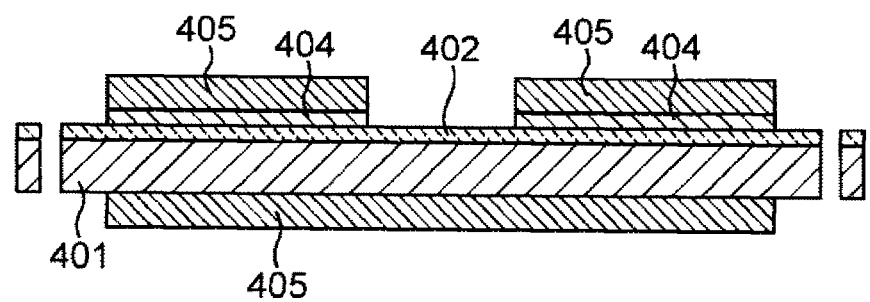
FIGS. 19g to 19h are schematic cross-sectional views for describing manufacture of the capacitor of Example 4.
Figure 19H:
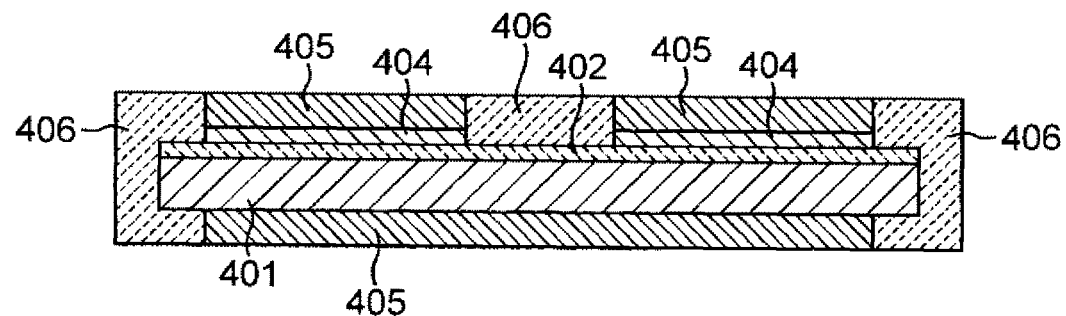

Finally, the mask 403 was removed (FIG. 19f), the substrate was cut with a laser to be cut into respective elements (FIG. 19g), a glass layer 406 as a protective layer was formed (FIG. 19h), and a capacitor of Example 4 having a structure shown in FIGS. 8 and 9 was obtained.

Example 5

Manufacture of Capacitor 1e

Figure 20A:
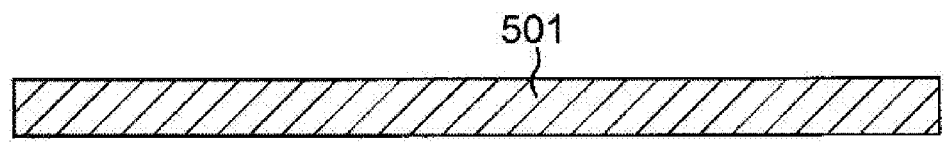
FIGS. 20a to 20c are schematic cross-sectional views for describing manufacture of a capacitor of Example 5.

As a conductive porous substrate, an aluminum etching foil 501 having a porous portion was prepared (FIG. 20a).

Figure 20B:
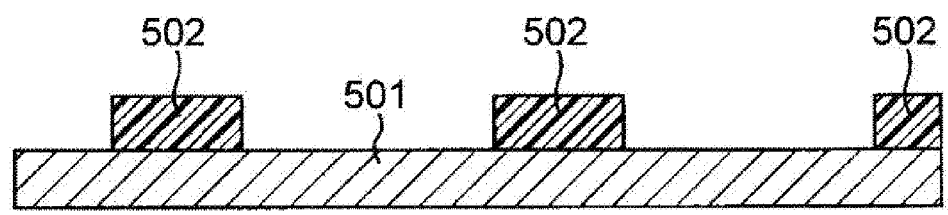
Figure 20C:
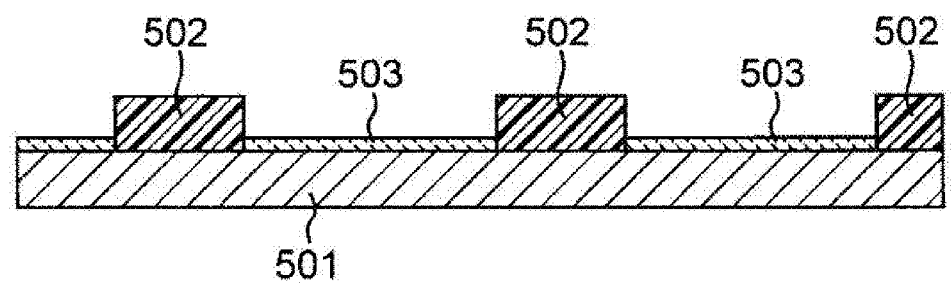

Then, a mask 502 was formed by screen-printing a polyimide resin on the aluminum etching foil 501 (FIG. 20b), and subsequently an AlOx layer 503 as a dielectric layer was formed with a thickness of 20 nm on the entire top surface of the substrate by the ALD method (FIG. 20c).

Figure 20D:
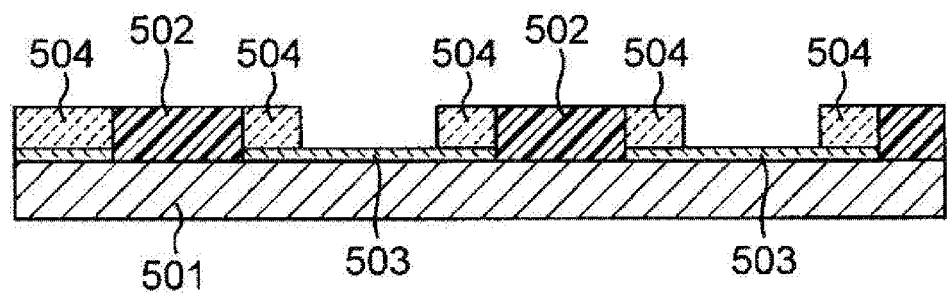
FIGS. 20d to 20f are schematic cross-sectional views for describing manufacture of the capacitor of Example 5.
Figure 20E:
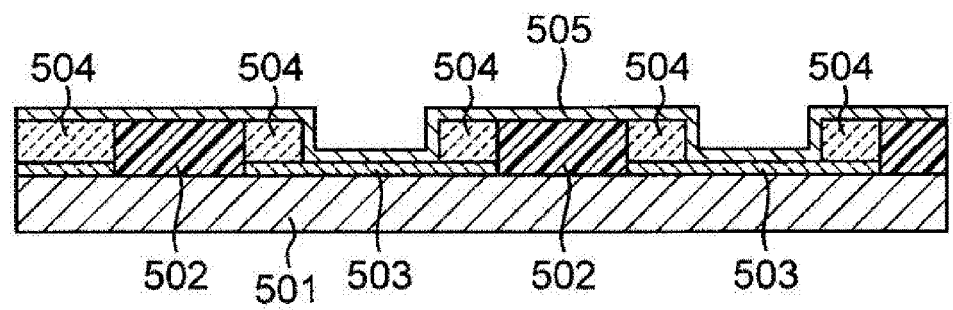

Then, a glass layer 504 as a protective layer was formed (FIG. 20d), and subsequently a TiN layer 505 as an upper electrode was formed with a thickness of 20 nm on the entire top surface of the substrate by the ALD method (FIG. 20e).

Figure 20F:
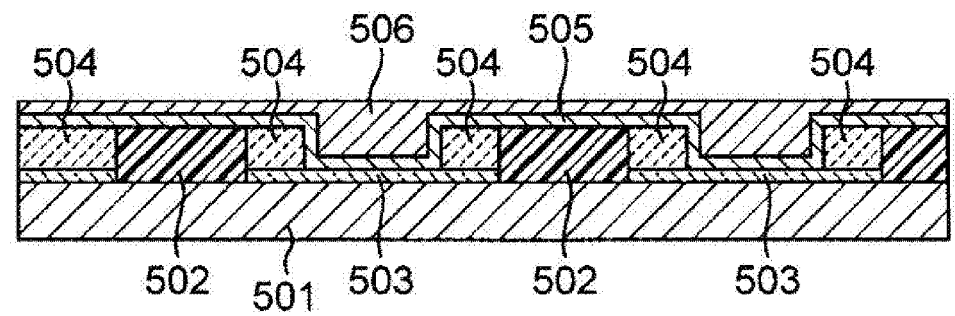
Figure 20G:
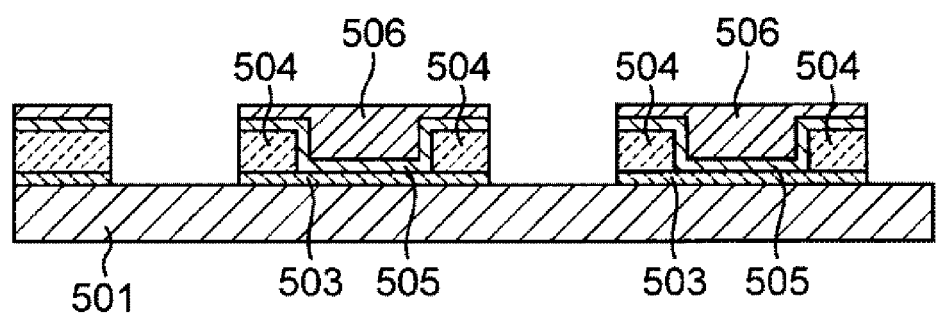
FIGS. 20g to 20h are schematic cross-sectional views for describing manufacture of the capacitor of Example 5.

Then, a copper layer 506 as a first terminal electrode or a second terminal electrode was formed by plating (FIG. 20f), and the mask 502 was removed (FIG. 20g).

Figure 20H:
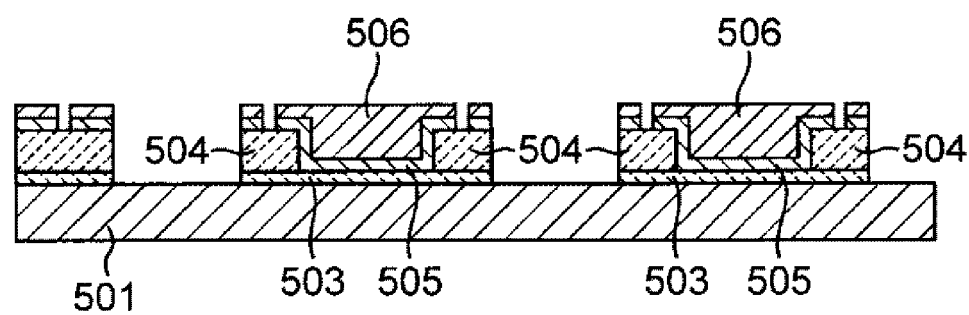
Figure 20I:
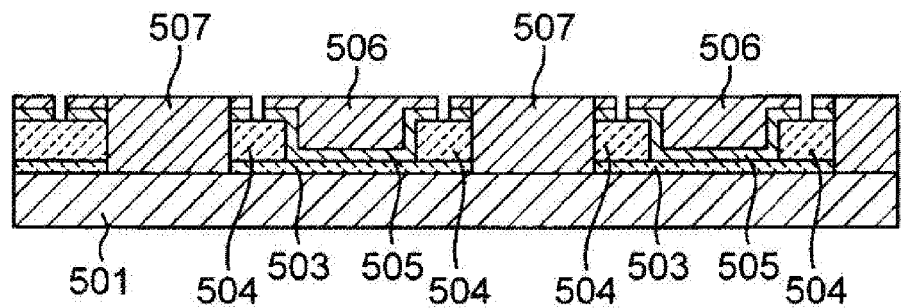
FIGS. 20i to 20k are schematic cross-sectional views for describing manufacture of the capacitor of Example 5.

Then, central portions of the TiN layer 505 and the copper layer 506 on the protective layer 504 were removed by laser (FIG. 20h), and a copper layer 507 as a third terminal electrode was formed by plating (FIG. 17i).

Figure 20J:
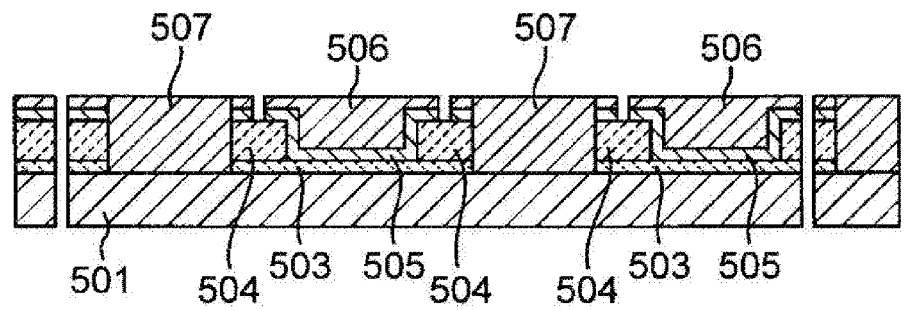
Figure 20K:
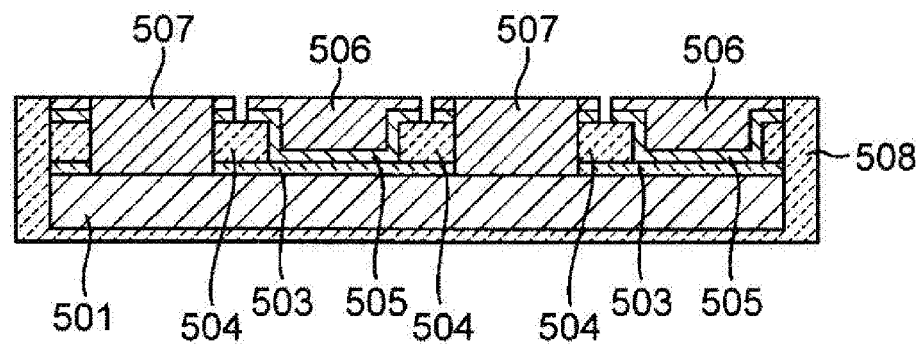

Finally, the substrate was cut with a laser to be cut into respective elements (FIG. 20j), a glass layer 508 as a protective layer was formed (FIG. 20k), and a capacitor of Example 5 having a structure shown in FIGS. 10 and 11 was obtained.

Example 6

Manufacture of Capacitor 1f

Figure 21A:
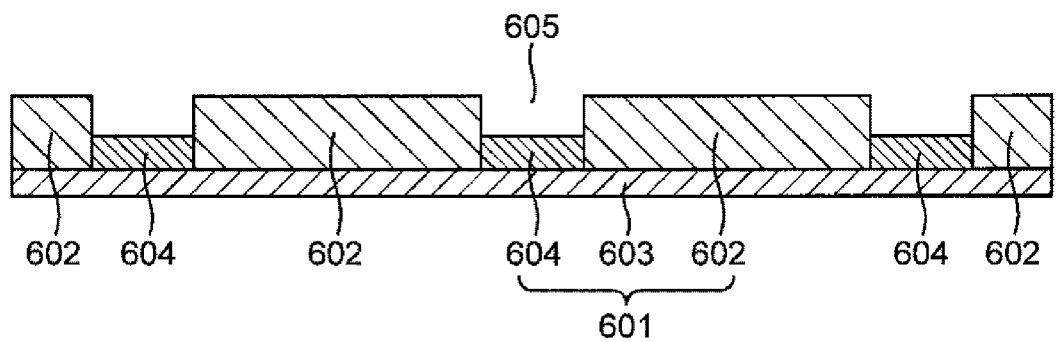
FIGS. 21a to 21c are schematic cross-sectional views for describing manufacture of a capacitor of Example 6.

As a conductive porous substrate 601, a commercially-available aluminum etched foil for aluminum electrolytic capacitor having a thickness of 50 μm, having a porous portion (high porosity portion) 602 only on its one surface and a support portion 603 on the other surface, and having an expanded surface ratio of about 200 times was prepared. A portion of the porous portion 602 was treated on the conductive porous substrate 601 by laser irradiation to form a low porosity portion 604 and a groove portion 605 (FIG. 21a).

Figure 21B:
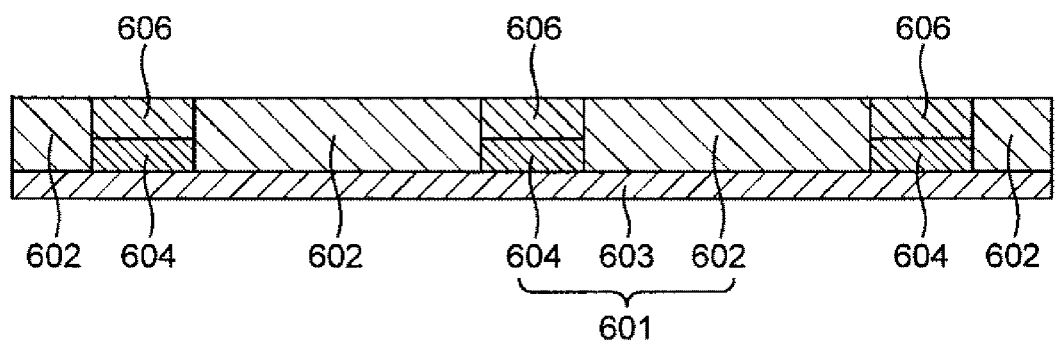

Then, a polyimide resin was applied into the groove portion 605 with an air dispenser to form an insulating portion 606 (FIG. 21b).

Figure 21C:
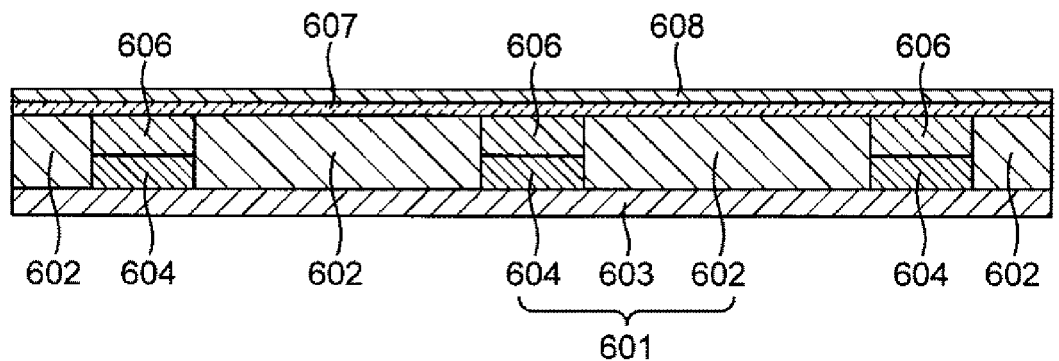
Figure 21D:
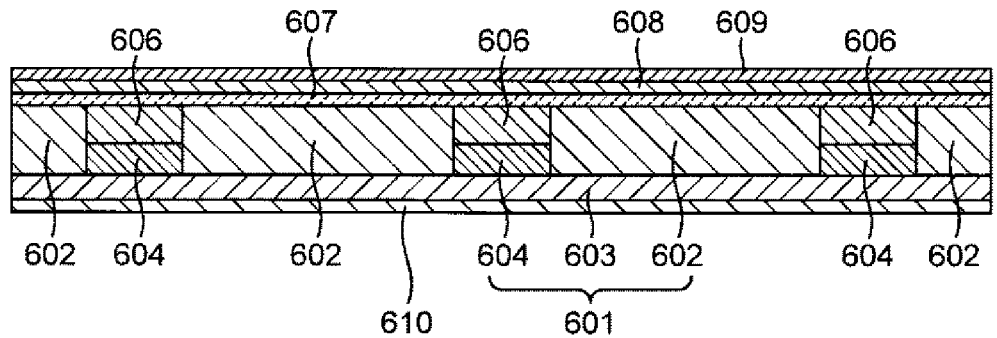
FIGS. 21d to 21e are schematic cross-sectional views for describing manufacture of the capacitor of Example 6.

Then, an AlOx layer as a dielectric layer 607 was formed with a thickness of 20 nm by the ALD method. Then, a TiN film as an upper electrode 608 was formed with a thickness of 20 nm by the ALD method (FIG. 21c). Then, a lower surface of the conductive porous substrate was subjected to zincate treatment, and a nickel plating layer was formed by electroless plating. Subsequently, respective copper plating layers as a first terminal electrode 609 and a second terminal electrode 610 were formed on the upper and lower surfaces of the conductive porous substrate by electroless plating (FIG. 21d). Consequently, a collective board having a large number of electrostatic capacitance forming sections was obtained.

Figure 21E:
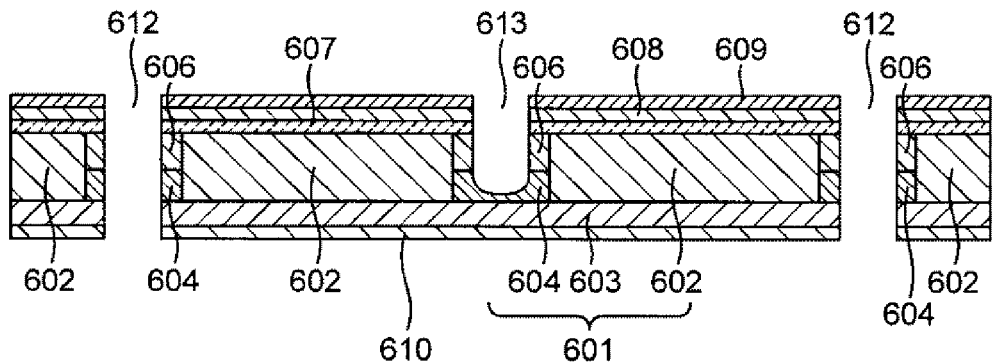
Figure 22:
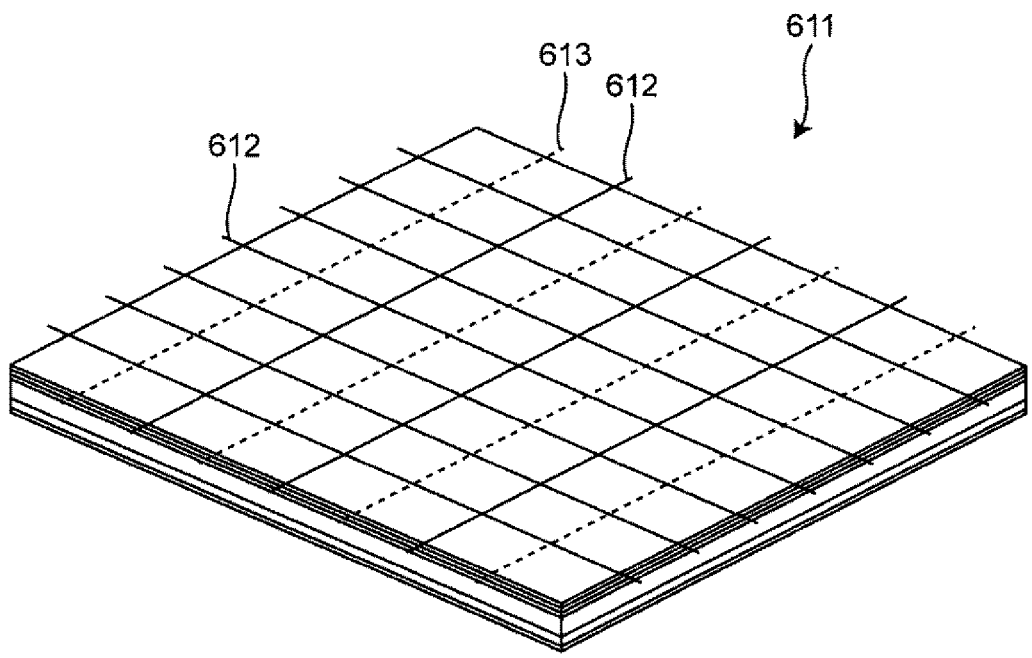
FIG. 22 is a schematic perspective view for describing a cutting process for a collective board of Example 6.

Then, the center portion of the insulating portion 606 filled in the groove portion 605 of the collective board was cut (FIG. 21e). In this case, only full cutting was performed in the lateral direction (completely cut; full-cut portion 612), and full cutting and half cutting (not completely cut, leaving a portion of the conductive porous substrate; half-cut portion 613) were alternately performed in the longitudinal direction (see FIG. 22). In the half-cut portion, it is sufficient that the upper electrode 608 (and the first terminal electrode 609 located thereon) can be cut. Thereby, a capacitor of Example 5 having a structure as shown in FIGS. 13 and 14 was obtained.

The capacitor of the present invention is safe, has high electrostatic capacitance and low ESR, and does not have polarity, so that it is suitably used for various electronic devices.

DESCRIPTION OF REFERENCE SYMBOLS 1a, 1b, 1c, 1d, 1e: Capacitor
2: Conductive porous substrate
4: Dielectric layer
6: First upper electrode
8: Second upper electrode
10: First terminal electrode
12: Second terminal electrode
14: Protective layer
22: Conductive porous substrate
24: First dielectric layer
26: First upper electrode
28: Second dielectric layer
30: Second upper electrode
32: First terminal electrode
34: Second terminal electrode
36: Protective layer
42: Conductive porous substrate
44: First dielectric layer
46: First upper electrode
48: Second dielectric layer
50: Second upper electrode
52: First terminal electrode
54: Second terminal electrode
56: Protective layer
58: Another metal layer
61: Conductive porous substrate
62: Dielectric layer
63: First upper electrode
64: Second upper electrode
65: First terminal electrode
66: Second terminal electrode
67: Third terminal electrode
68: Protective layer
71: Conductive porous substrate
72: Dielectric layer
73: First upper electrode
74: Second upper electrode
75: First terminal electrode
76: Second terminal electrode
77: Third terminal electrode
78: Protective layer
81: Conductive porous substrate
82: First dielectric layer
83: Second dielectric layer
84: First upper electrode
85: Second upper electrode
86: First terminal electrode
87: Second terminal electrode
88: High porosity portion
89: Low porosity portion
90: Support portion
91: Third terminal electrode
92: Insulating portion
93: Groove portion
101: Aluminum etching foil
102: Dielectric layer (AlOx layer)
103: Mask
104: Upper electrode (TiN layer)
105: Terminal electrode (copper layer)
106: Protective layer (glass layer)
201: Aluminum etching foil
202: Dielectric layer (AlOx layer)
203: Upper electrode (TiN layer)
204: Terminal electrode (copper layer)
205: Protective layer (glass layer)
301: Aluminum etching foil
302: Dielectric layer (AlOx layer)
303: Upper electrode (TiN layer)
304: Lead electrode (copper layer)
305: Protective layer (glass layer)
306: Plating resist
307: Terminal electrode (copper layer)
401: Aluminum etching foil
402: Dielectric layer (AlOx layer)
403: Mask
404: Upper electrode (TiN layer)
405: Terminal electrode (copper layer)
406: Protective layer (glass layer)
501: Aluminum etching foil
502: Mask
503: Dielectric layer (AlOx layer)
504: Protective layer (glass layer)
505: Upper electrode (TiN layer)
506: Terminal electrode (copper layer)
507: Terminal electrode (copper layer)
508: Protective layer (glass layer)
601: Conductive porous substrate
602: Porous portion (high porosity portion)
603: Support portion
604: Low porosity portion
605: Groove portion
606: Insulating portion
607: Dielectric layer
608: Upper electrode
609: First terminal electrode
610: Second terminal electrode
611: Collective board
612: Full-cut portion
613: Half-cut portion

The invention claimed is:

1. A capacitor comprising:
   a conductive porous substrate having at least two electrostatic capacitance forming sections, each of the at least two electrostatic capacitance forming sections including a porous portion of the conductive porous substrate, a dielectric layer on the porous portion, and an upper electrode on the dielectric layer, wherein
   the at least two electrostatic capacitance forming sections are electrically connected in series by the conductive porous substrate,
   the at least two electrostatic capacitance forming sections are adjacent to each other and are isolated by a groove, and
   the conductive porous substrate includes, for each of the at least two electrostatic capacitance forming sections, a first porosity portion and a second porosity portion, the first porosity portion having a higher porosity than the second porosity portion.

2. The capacitor according to claim 1, wherein all of the at least two electrostatic capacitance forming sections are on a first surface of the conductive porous substrate.

3. The capacitor according to claim 1, wherein there are only two electrostatic capacitance forming sections in the capacitor.

4. The capacitor according to claim 1, further comprising a terminal electrode directly connected to the conductive porous substrate.

5. The capacitor according to claim 4, wherein
   a first surface of the conductive porous substrate has a plurality of sections defined by a rectangular lattice,
   each section includes one of (1) one electrostatic capacitance forming section of the at least two electrostatic capacitance forming sections and (2) the terminal electrode,
   all sections adjacent to the section including the one electrostatic capacitance forming section of the at least two electrostatic capacitance forming sections include the terminal electrode, and
   all sections adjacent to the section including the terminal electrode include the one electrostatic capacitance forming section of the at least two electrostatic capacitance forming sections.

6. The capacitor according to claim 5, wherein the terminal electrode is not exposed on a surface of the capacitor.

7. The capacitor according to claim 1, wherein each of the at least two electrostatic capacitance forming sections further include a terminal electrode on the upper electrode.

8. The capacitor according to claim 1, wherein a porosity of the porous portion of the conductive porous substrate is from 20% to 90%.

9. The capacitor according to claim 1, wherein a porosity of the porous portion of the conductive porous substrate is from 60% to 80%.

10. A capacitor comprising:
    a conductive porous substrate having at least two electrostatic capacitance forming sections, each of the at least two electrostatic capacitance forming sections including a porous portion of the conductive porous substrate, a dielectric layer on the porous portion, and an upper electrode on the dielectric layer, wherein
    the at least two electrostatic capacitance forming sections are electrically connected in series by the conductive porous substrate, and
    wherein the conductive porous substrate includes, for each of the at least two electrostatic capacitance forming sections, a first porosity portion and a second porosity portion, the first porosity portion having a higher porosity than the second porosity portion.

* * * * *